(12) United States Patent
Coulombe

(10) Patent No.: US 7,922,220 B2
(45) Date of Patent: Apr. 12, 2011

(54) SAFETY HOOK

(76) Inventor: Don F. Coulombe, Fenwick (CA)

(*) Notice: Subject to any disclaimer, the term of this patent is extended or adjusted under 35 U.S.C. 154(b) by 519 days.

(21) Appl. No.: 11/881,855

(22) Filed: Jul. 30, 2007

(65) Prior Publication Data

US 2008/0185848 A1 Aug. 7, 2008

Related U.S. Application Data

(63) Continuation-in-part of application No. 11/703,418, filed on Feb. 7, 2007.

(51) Int. Cl.
*E05C 19/00* (2006.01)
(52) U.S. Cl. ............ 292/1; 292/113; 24/600.1; 24/601.1
(58) Field of Classification Search .................. 292/113, 292/1; 24/584.1–600.9; 294/82.2
See application file for complete search history.

(56) References Cited

U.S. PATENT DOCUMENTS

| | | | | |
|---|---|---|---|---|
| 470,980 | A * | 3/1892 | Dickey et al. | 24/599.5 |
| RE16,613 | E * | 5/1927 | Moody | 294/82.2 |
| 1,626,866 | A * | 5/1927 | Neilson | 294/82.2 |
| 1,879,167 | A * | 9/1932 | Freysinger | 24/599.5 |
| 1,949,608 | A * | 3/1934 | Johnson | 24/599.5 |
| 1,964,428 | A * | 6/1934 | Duffy | 24/600.1 |
| 2,490,931 | A * | 12/1949 | Thompson | 24/599.5 |
| 3,317,972 | A * | 5/1967 | Harley | 24/599.4 |
| 3,831,994 | A * | 8/1974 | Martin | 294/82.21 |
| 3,847,423 | A | 11/1974 | Gley | |
| 4,062,092 | A * | 12/1977 | Tamada et al. | 24/599.4 |
| 4,122,585 | A * | 10/1978 | Sharp et al. | 294/82.2 |
| 4,539,732 | A * | 9/1985 | Wolner | 24/600.2 |
| 4,977,647 | A * | 12/1990 | Casebolt | 24/599.5 |
| 5,257,441 | A * | 11/1993 | Barlow | 24/599.5 |
| 5,361,464 | A * | 11/1994 | Bunnell | 24/599.5 |
| 5,438,736 | A * | 8/1995 | Terada et al. | 24/599.8 |
| 5,579,564 | A * | 12/1996 | Rullo et al. | 24/599.5 |
| 5,735,025 | A * | 4/1998 | Bailey | 24/600.1 |
| 5,896,630 | A * | 4/1999 | Smith et al. | 24/600.1 |
| 5,927,431 | A * | 7/1999 | Klein, Jr. | 182/3 |
| 6,161,264 | A * | 12/2000 | Choate | 24/599.5 |
| 6,283,524 | B1 * | 9/2001 | Simond | 294/82.2 |
| 6,718,601 | B1 * | 4/2004 | Choate | 24/600.2 |
| 6,832,417 | B1 * | 12/2004 | Choate | 24/600.1 |
| 7,353,572 | B2 * | 4/2008 | Claus et al. | 24/600.1 |
| 7,437,806 | B2 * | 10/2008 | Lin | 24/599.5 |
| 7,444,723 | B2 * | 11/2008 | Lin | 24/600.1 |
| 2007/0062014 | A1 * | 3/2007 | Casebolt | 24/600.1 |
| 2007/0067970 | A1 * | 3/2007 | Claus et al. | 24/599.9 |
| 2008/0174130 | A1 * | 7/2008 | Lin | 294/82.2 |
| 2008/0184540 | A1 * | 8/2008 | Coulombe | 24/599.1 |
| 2008/0185848 | A1 * | 8/2008 | Coulombe | 292/1 |
| 2009/0049663 | A1 * | 2/2009 | Hong | 24/600.1 |

* cited by examiner

*Primary Examiner* — Carlos Lugo
*Assistant Examiner* — Kristina R Fulton
(74) *Attorney, Agent, or Firm* — Simpson & Simpson, PLLC

(57) ABSTRACT

A safety mechanism for a gate having first and second ends, a first fulcrum point intermediate the first and second ends and a first rotational axis proximate the second end, the safety mechanism including a first force resisting means intermediate the first fulcrum point and the first rotational axis, wherein a force applied to the first end is transmitted toward the first rotational axis via the first fulcrum point and the first force resisting means prevents transmission of the force to the first rotational axis. The present invention also comprises a safety mechanism for a gate having first and second ends, a locking means and a first rotational axis proximate said second end, wherein a force applied to the first end is transmitted toward the first rotational axis via the locking means, the safety mechanism including a first force resisting means intermediate the first rotational axis and the force, wherein the first force resisting means prevents transmission of the force to the first rotational axis.

23 Claims, 14 Drawing Sheets

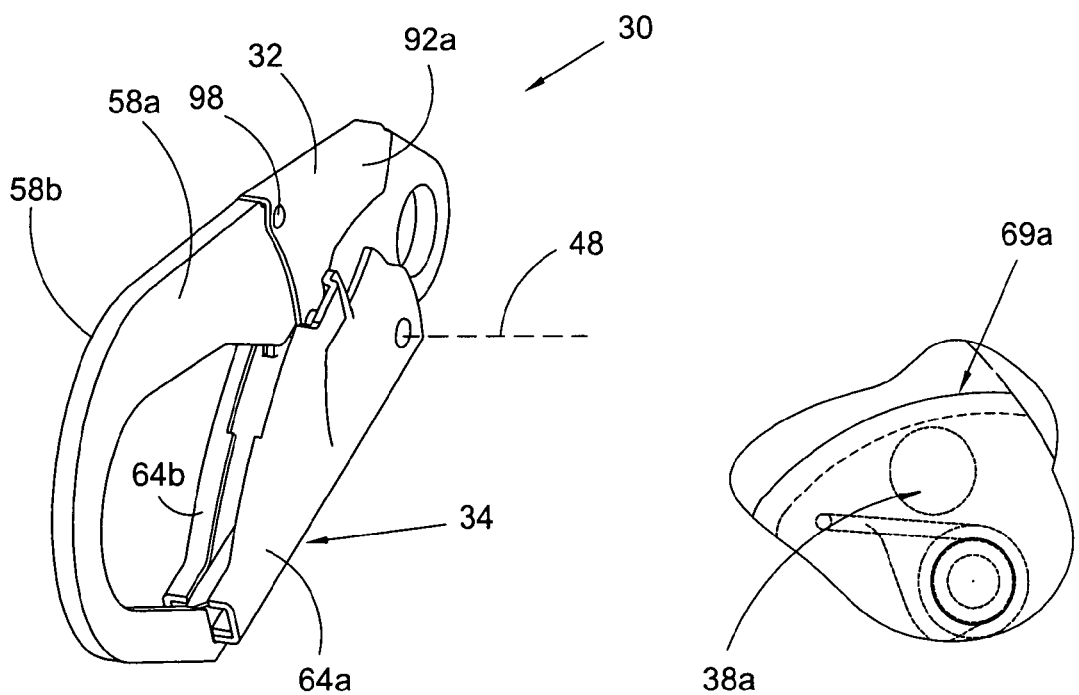
Fig. 1
Fig. 2a
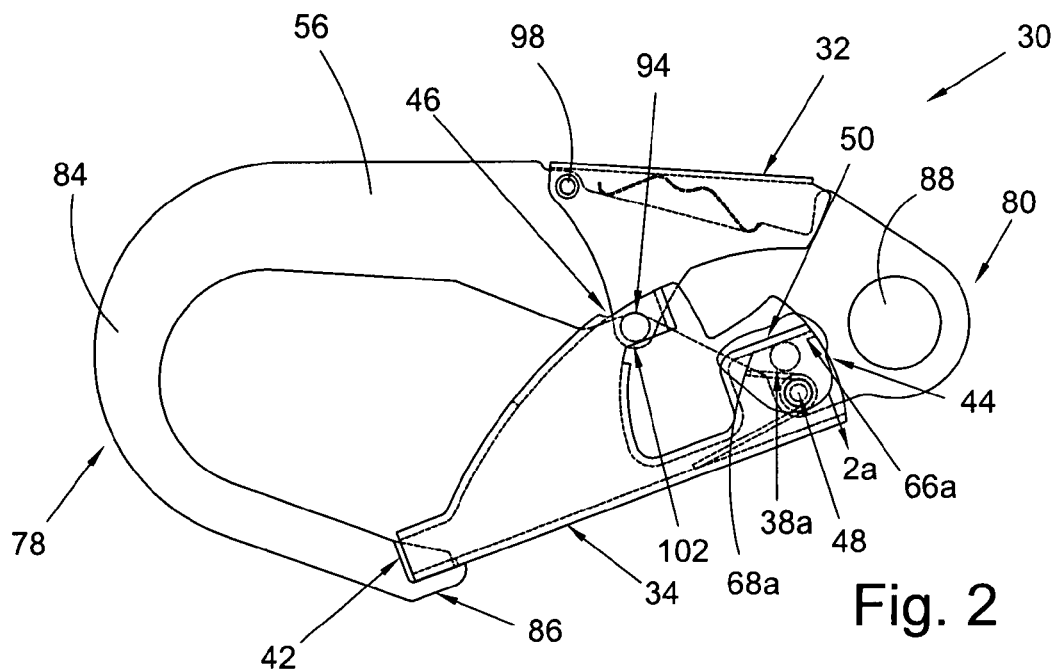
Fig. 2

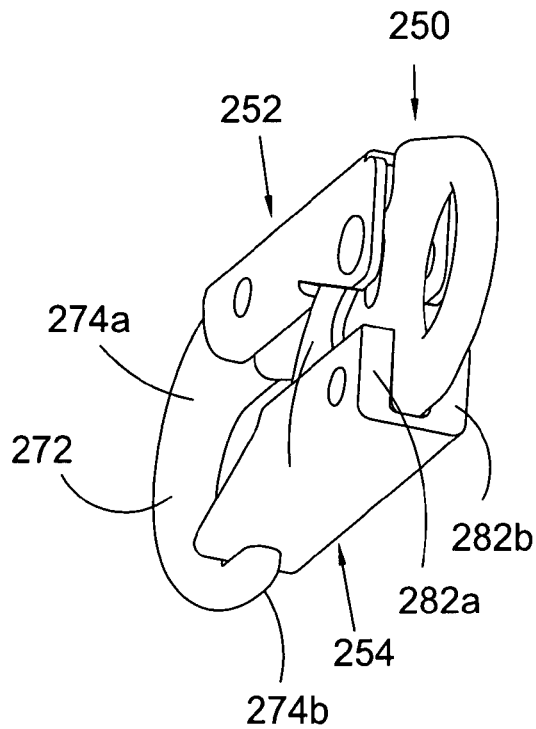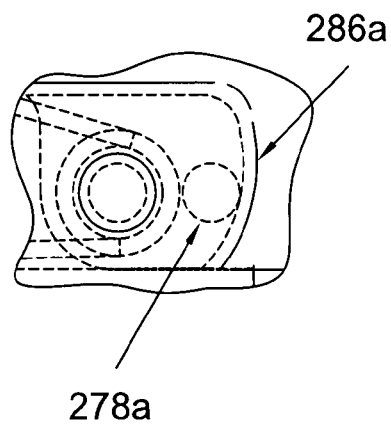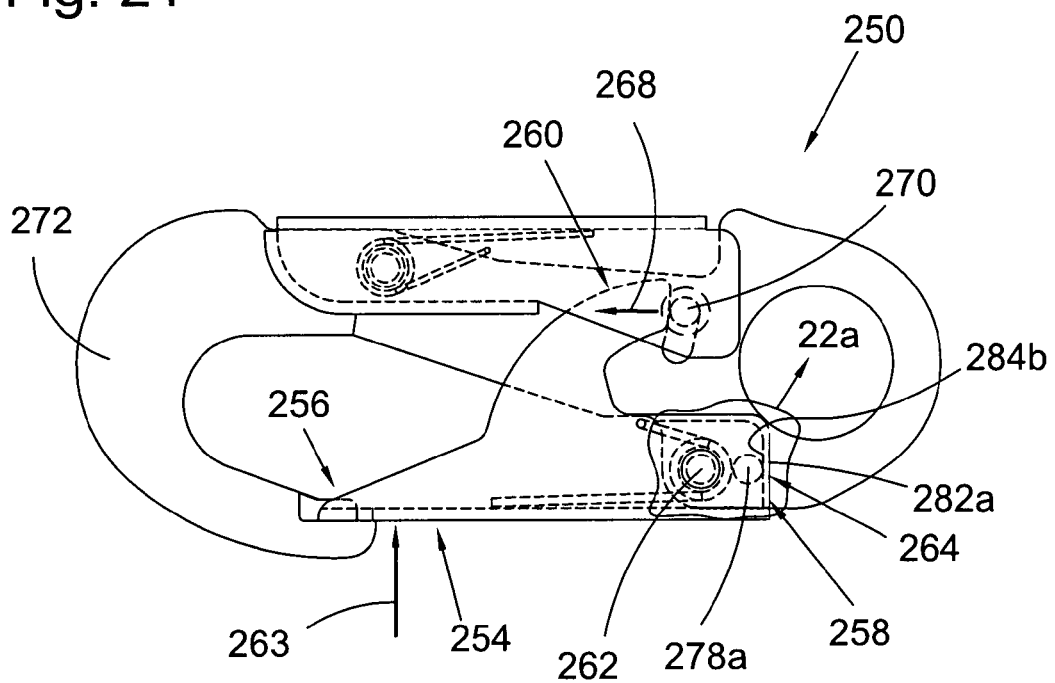

SAFETY HOOK

CROSS-REFERENCE TO RELATED APPLICATIONS

This application is a Continuation-in-Part of application Ser. No. 11/703,418, filed on Feb. 7, 2007, which application is incorporated herein by reference.

FIELD OF THE INVENTION

The invention broadly relates to hooks, more specifically to safety hooks, and even more particularly to safety hooks having increased body and gate strength.

BACKGROUND OF THE INVENTION

Federal and state regulations often require persons working at elevated heights to utilize fall-arrest equipment. Fall-arrest equipment commonly includes a body harness for attaching to a user and a lanyard for connecting to an anchorage point. Often, the final connection to the anchorage point is made with a hook or a carabiner at the end of the lanyard. Although, regardless of the type of connection, the connector must be manufactured to meet American National Standards Institute (ANSI) and Occupational Safety and Health Administration (OSHA) standards for minimum strength requirements for the hook body, gate/latch and locking mechanism. Additionally, other standards may also apply, for example, depending on the connectors intended use.

Safety hooks typically include a hook body, release lever (also known as a lock lever) and a gate. Additionally, safety hooks typically include springs and fasteners that hold the body, gate and release lever together and in a locked position. The release lever or lock lever of a hook is arranged to shift the locking mechanism away from the gate to allow the gate to open. The gate of a hook is arranged to prevent the hook from disengaging from an anchorage point, while the locking mechanism prevents the gate from opening unintentionally.

Under ideal circumstances, when a person falls, the connector, e.g., the hook, hangs vertically and the force of the fall is absorbed along the principal axis of the hook body. However, anchorage points vary greatly from specifically engineered hardware, to structural elements in buildings and fabrications, to even tree limbs. Because of the wide range of anchorage situations, and the variety of positions a person may be in when they fall relative to the anchorage point, the hook may be prevented from moving to its ideal vertical hanging position. In such situations, forces from the fall may act against the gate/latch and/or locking mechanism, which in the majority of hooks are not as strong as the hook body. Component failure and personal injury are often results of such falls, thus the need for latching mechanisms that can withstand greater forces.

Current ANSI and OSHA standards require hooks and carabiners to be self-closing, self-locking and capable of being opened only by at least two consecutive deliberate actions. Proposed new ANSI standards, e.g., Z 359.1-07ED, significantly change specifications for fall-arrest hardware. The following table summarizes recent proposed changes to the aforementioned standard:

TABLE 1

| Hardware Feature | Test description | Existing standard | Proposed Standard |
| --- | --- | --- | --- |
| Gate face | Load test for strength of gate and locking mechanism | 250 lbs | 3,600 lbs |
| Gate side | Load test for strength of gate in resisting side loads | 350 lbs | 3,600 lbs |

Hook bodies are most commonly constructed of heat treated carbon steel, forged or stamped, while the gate and lock lever are often constructed of stamped mild steel. However, one of ordinary skill in the art will recognize that other materials may also be used depending upon the desired strength of the assembled hook. For example, safety hooks that do not need to meet the described ANSI test standards may have molded plastic bodies, gates or release levers. Most prior art hooks act on the principal that force applied to the gate and lock, i.e., gate face load, is resisted by the strength of the gate and lock lever material and the rivets or fasteners they pivot on. Depending on the configuration of the mechanism, the force applied against the gate face, and transferred to the lock, can be multiplied by the 'lever nature' of both the gate and the lock lever, so that 3,600 lbs can become 5,000+lbs. Due to the configuration of these mechanisms, much of this load is applied against the rivets or fasteners of the gate and lock lever.

Some gates of prior art hooks can withstand 3,600 lb gate side loads, while others can be easily modified to withstand these loads, by constructing existing gates out of thicker heat treated materials, however such modifications increase cost, size and/or weight of a hook. Contrarily, gates are not so easily modified to withstand face loads, i.e., loads applied to the face of the gate which transmit from the gate to the locking mechanism and lock lever and subsequently to the rivets or fasteners on which they pivot and are mounted to the body with. It is impractical or simply impossible to make all elements, of existing hook designs, bigger, thicker or of stronger materials to withstand such loads. Such issues present particularly difficult problems to overcome when modifying prior art hooks which have larger hook bodies, e.g., hook bodies having lengths of six inches or greater. Hooks of such size can not merely have gates and/or locking mechanisms increased in size and/or thickness because their sizes and thicknesses would make them impractical to manufacture and use.

An additional issue present with hooks of this size is caused by the increased lengths of the hooks, and therefore increased lever arm lengths, e.g., the distance between the point of pressure applied to a gate and the locking point, and the distance between the locking point and the pivot axis of the gate. In this instance, when an amount of force is applied to the gate, the locking point acts as a fulcrum, and an increased amount of force is imparted on the pivot axis of the gate. Similarly, an increased lever arm is created from the point of pressure applied to a gate and the pivot axis of the gate. In this instance, when an amount of force is applied to the gate, the gate pivot axis acts as a fulcrum, and an increased amount of force is imparted on the locking point and thereby to the pivot axis of the locking lever. As these pivot axes at typically manufactured from rivets, there is a limited amount of strength which can be built into the pivot axis. Thus, when higher loads are applied to gates on larger hooks, the pivot axes, e.g., rivets, often fail due to their limited strength.

As can be derived from the variety of devices and methods directed at providing strength at gate and locking lever pivot axes, many means have been contemplated to accomplish the desired end, i.e., axes which can withstand elevated forces. Heretofore, tradeoffs between hook/material sizes and material types were required. Thus, there is a long-felt need for a hook which can withstand elevated gate face load forces without pivot axis failure. There is a further long-felt need for a safety hooks capable of passing increasing safety standards. There is also yet another long-felt need for a safety hook having the foregoing characteristics which functions easily and is economical and simple to manufacture.

BRIEF SUMMARY OF THE INVENTION

The present invention broadly comprises a safety mechanism for a gate having first and second ends, a fulcrum point intermediate the first and second ends and a first rotational axis proximate the second end, the safety mechanism including a first force resisting means intermediate the fulcrum point and the first rotational axis, wherein a force applied to the first end is transmitted toward the first rotational axis via the fulcrum point and the first force resisting means prevents transmission of the force to the first rotational axis. In some embodiments, the safety mechanism further includes a hook having a hook body including two sides, a first through-hole in aligned position with the first rotational axis and the first force resisting means includes a first protrusion extending from each of the two sides of the hook body and each of the first protrusions is proximate the first through-hole and the gate includes spaced apart parallel gate side walls. In other embodiments, the first force resisting means further includes an elevated portion disposed in each of the spaced apart parallel gate side walls and, the elevated portions arranged opposite each other and each of the elevated portions includes a bearing surface arranged for locking engagement with one of the first protrusions. In some of these embodiments, the elevated portions are substantially linear, while in others of these embodiments, the elevated portions are substantially curved. In yet other embodiments, the hook body has a thickness and the first protrusions are formed by a pin inserted through a second through-hole in the hook body, the pin having a length greater than the thickness. In still yet other embodiments, the first protrusions are formed integrally on the hook body, and in some of these embodiments, the first protrusions are co-axial.

In some embodiments of the present invention, the safety mechanism further includes a release lever having spaced apart parallel lever side walls, a second force resisting means and a second rotational axis, the lever side walls include a first locking means, the gate side walls include a second locking means arranged to complimentarily engage the first locking means, the hook body further includes a second through-hole in aligned position with the second rotational axis and the second force resisting means includes a second protrusion extending from each of the two sides of the hook body and each of the second protrusions is proximate the second through-hole, wherein the second force resisting means is arranged to engage the second protrusions when the force is applied to the gate. In other embodiments, the second force resisting means further includes an elevated portion disposed in each of the spaced apart parallel lever side walls, the elevated portions arranged opposite each other and each of the elevated portions includes a bearing surface arranged for locking engagement with one of the second protrusions. In some of these embodiments, the elevated portions are substantially linear, while in others of these embodiments, the elevated portions are substantially curved. In other embodiments, the hook body has a thickness and the second protrusions are formed by a pin inserted through the second through-hole in the hook body, the pin having a length greater than the thickness, while in still other embodiments, the second protrusions are formed integrally on the hook body, and in some of these embodiments, the second protrusions are co-axial.

The present invention also broadly comprises a hook including a first force resisting means, a hook body having two sides, first and second ends, first and second through-holes and the first force resisting means includes a first protrusion extending from each of the two sides and each of the first protrusions is proximate the second through-hole, the first end includes a bent portion having a nose, the second end includes an opening, and the first and second through-holes define first and second rotational axes, respectively. The present invention further includes a release lever having spaced apart parallel lever side walls, the lever side walls include a first locking means and third and fourth through-holes, the third and fourth through-holes are oppositely disposed, aligned with the first through-hole, and include a release lever mounting rivet disposed therethrough, and the hook still further includes a gate having spaced apart parallel gate side walls, the gate side walls including a second locking means and fifth and sixth through-holes, the fifth and sixth through-holes are oppositely disposed, aligned with the second through-hole, and include a gate mounting rivet disposed therethrough, the gate arranged to engage the nose, the second locking means arranged to complimentarily engage the first locking means, wherein the first force resisting means arranged to engage the first protrusions when a force is applied against the gate in a direction to rotate the gate about the second rotational axis and pivoting of the release lever about a first rotational axis disengages the first and second locking means and permits pivoting of the gate about the second rotational axis.

In some embodiments, the hook body has a thickness and the first protrusions are formed by a pin inserted through a seventh through-hole in the hook body, the pin having a length greater than the thickness, while in other embodiments, the first protrusions are formed integrally on the hook body, and in some of these embodiments, the first protrusions are co-axial. In yet other embodiments, the first force resisting means further includes an elevated portion disposed in each of the spaced apart parallel gate side walls, the elevated portions arranged opposite each other and each of the elevated portions includes a bearing surface arranged for locking engagement with one of the first protrusions. In some of these embodiments, the elevated portions are substantially linear, while in others of these embodiments, the elevated portions are substantially curved.

In still yet other embodiments, the hook further includes a second force resisting means, the second force resisting means includes a second protrusion extending from each of the two sides of the hook body and each of the second protrusions is proximate the first through-hole, wherein the second force resisting means is arranged to engage the second protrusions when the force is applied against the gate in a direction to rotate the gate about the second rotational axis. In some embodiments, the second force resisting means further includes an elevated portion disposed in each of the spaced apart parallel lever side walls, the elevated portions arranged opposite each other and each of the elevated portions includes a bearing surface arranged for locking engagement with one of the second protrusions. In some of these embodiments, the elevated portions are substantially linear, while in others of these embodiments, the elevated portions are substantially curved. In still other embodiments, the hook body has a thickness and the second protrusions are formed by a pin inserted through a seventh through-hole in the hook body, the pin having a length greater than the thickness, while in still yet other embodiments, the second protrusions are formed integrally on the hook body, and in some of these embodiments, the second protrusions are co-axial.

In still further embodiments, the present invention broadly comprises a safety mechanism for a gate having first and second ends, a locking means and a first rotational axis proximate the second end, wherein a force applied to the first end is transmitted toward the first rotational axis via the locking means, the safety mechanism including a first force resisting means intermediate the first rotational axis and the force, wherein the first force resisting means prevents transmission of the force to the first rotational axis. In some embodiments, the first force resisting means is proximate the first rotational axis. In other embodiments, the safety mechanism further includes a hook having a hook body including two sides, a first through-hole in aligned position with the first rotational axis and the first force resisting means includes a first protrusion extending from each of the two sides of the hook body and each of the first protrusions is proximate the first through-hole and the gate includes spaced apart parallel gate side walls. In yet other embodiments, the first force resisting means further includes an elevated portion disposed in each of the spaced apart parallel gate side walls and, the elevated portions arranged opposite each other and each of the elevated portions includes a bearing surface arranged for locking to engagement with one of the first protrusions. In some of these embodiments, the elevated portions are substantially linear, while in others of these embodiments, the elevated portions are substantially curved. In still yet other embodiments, the hook body has a thickness and the first protrusions are formed by a pin inserted through a second through-hole in the hook body, the pin having a length greater than the thickness. In still other embodiments, the first protrusions are formed integrally on the hook body, and in some of these embodiments, the first protrusions are co-axial.

It is a general object of the present invention to provide a safety hook capable of withstanding elevated gate face loads.

It is another general object of the present invention to provide a safety hook which is simple and economical to manufacture.

It is a further object of the present invention to provide a safety hook which includes a locking mechanism that is simple and easy to operate.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 is a perspective view of a first embodiment of a present invention safety hook;

FIG. 2 is a side elevational view of the safety hook shown in FIG. 1 with the release lever in a locked position and the gate in a closed position showing internal features in broken lines;

FIG. 2a is a side elevational view of encircled region 2a in FIG. 2 showing another embodiment of a present invention force resisting means;

FIG. 21 is a perspective view of a third embodiment of a present invention safety hook;

FIG. 22 is a side elevational view of the safety hook shown in FIG. 21 with the release lever in a locked position and the gate in a closed position showing internal features in broken lines;

FIG. 22a is a side elevational view of encircled region 22a in FIG. 22 showing still yet another embodiment of a present invention force resisting means; and, FIG. 23 is an exploded perspective view of the safety hook shown in FIG. 21.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed embodiments.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 3:
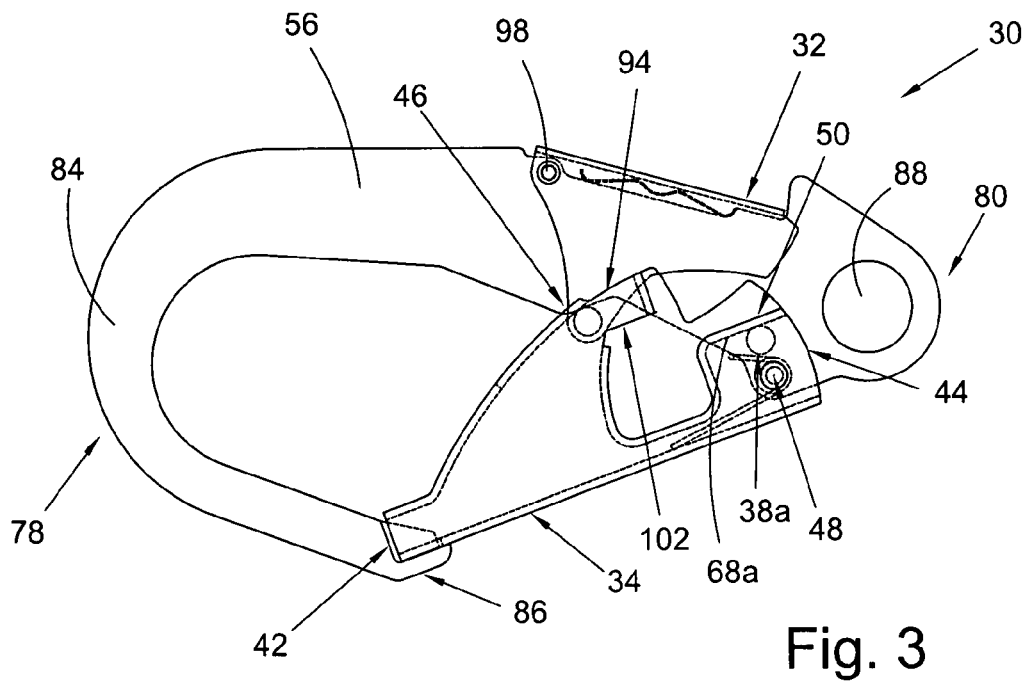
FIG. 3 is a side elevational view of the safety hook shown in FIG. 1 with the release lever in an unlocked position and the gate in a closed position showing internal features in broken lines.
Figure 4:
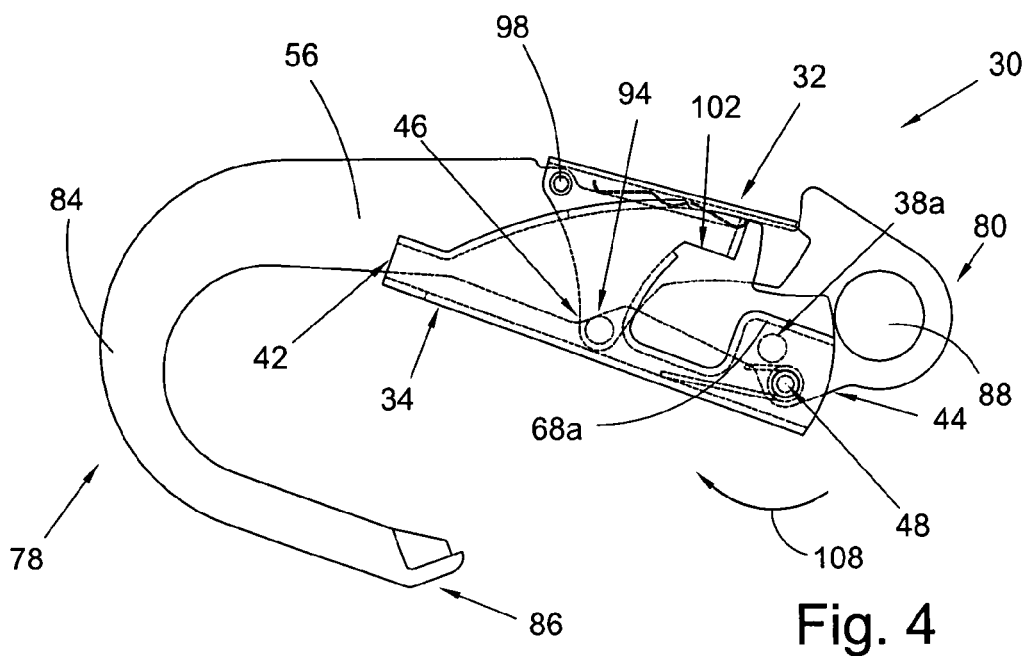
FIG. 4 is a side elevational view of the safety hook shown in FIG. 1 with the release lever in an unlocked position and the gate in an open position showing internal features in broken lines.
Figure 5:
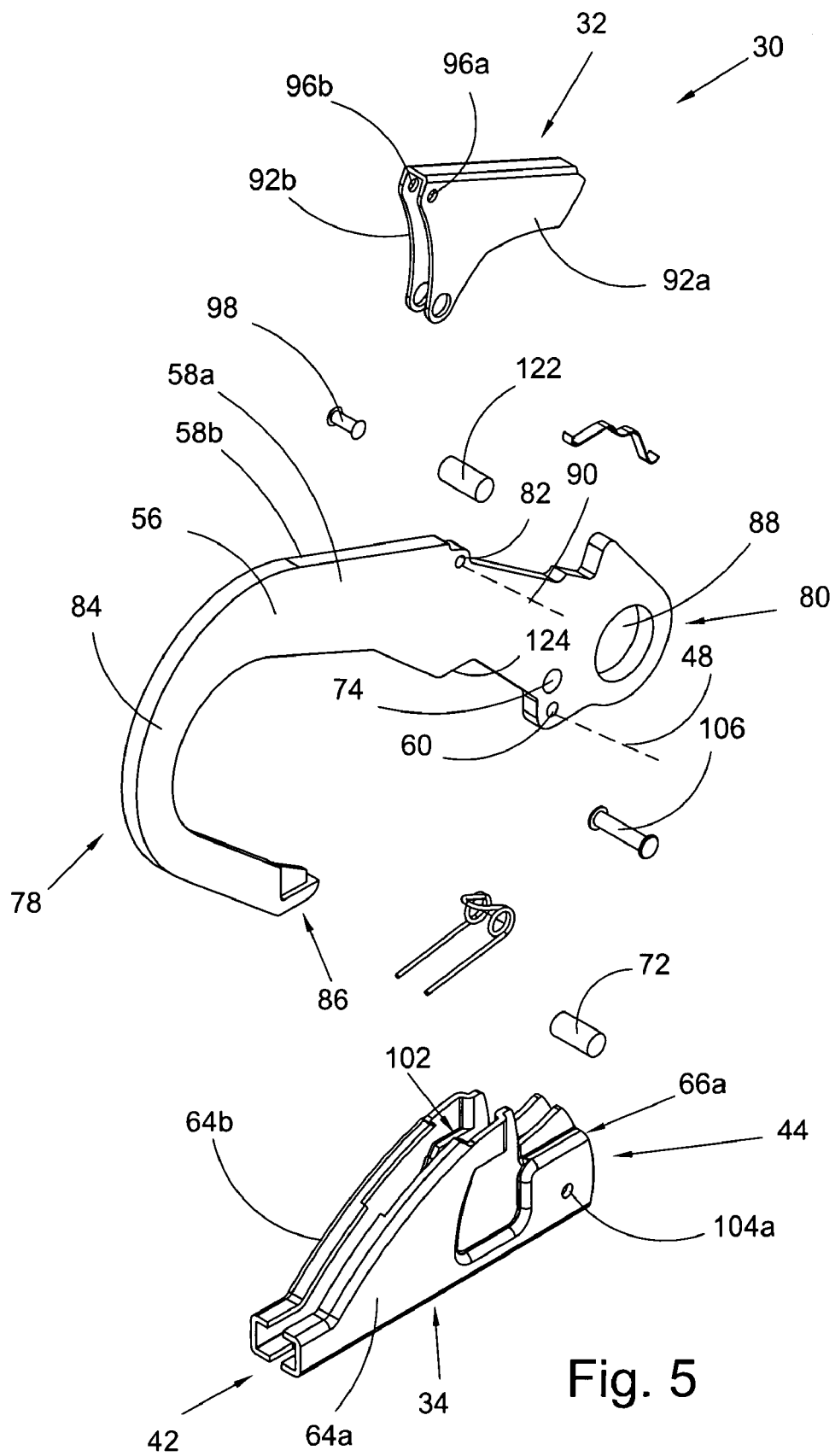
FIG. 5 is an exploded perspective view of the safety hook shown in FIG. 1.
Figure 6:
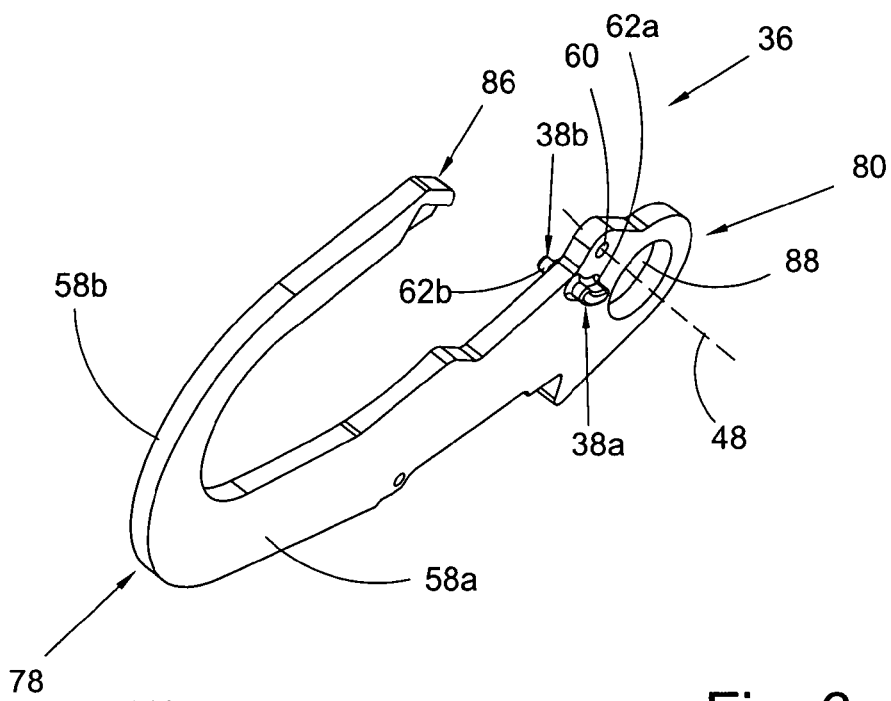
FIG. 6 is a perspective view of a second embodiment of a present invention safety hook body having integral protrusions.
Figure 7:
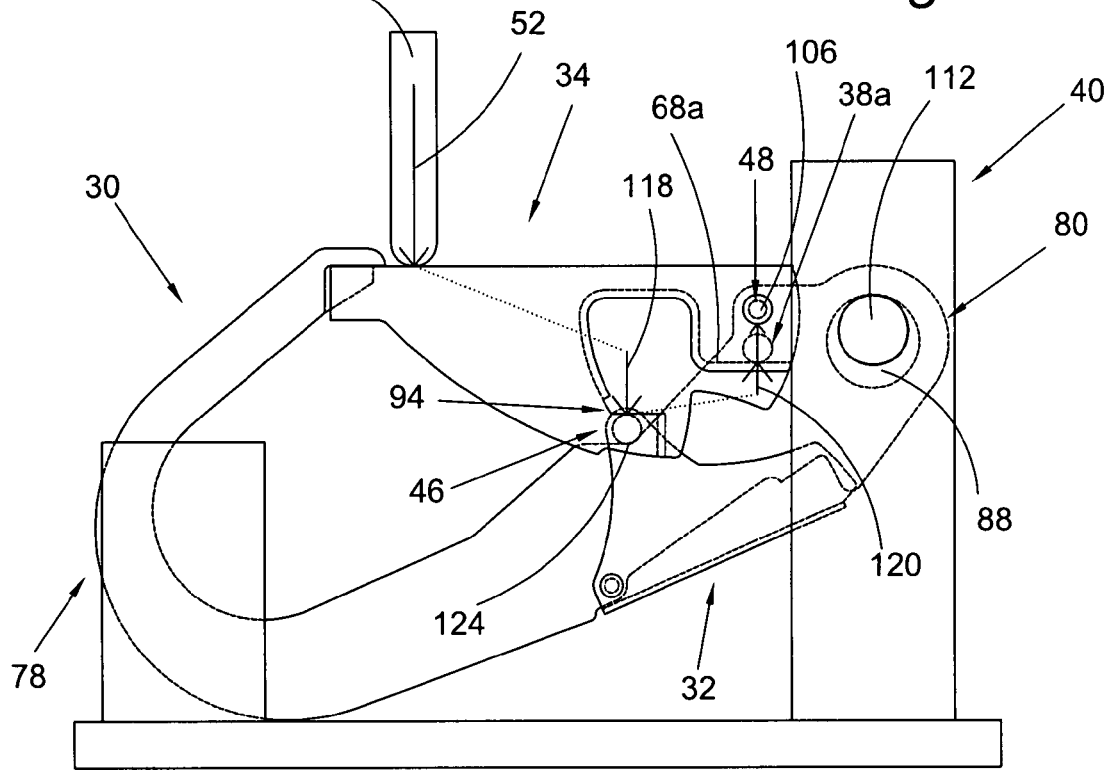
FIG. 7 is a side elevational view of the safety hook shown in FIG. 1 arranged in a gate face load force test fixture showing a gate face load being applied and the internal features in broken lines.
Figure 8:
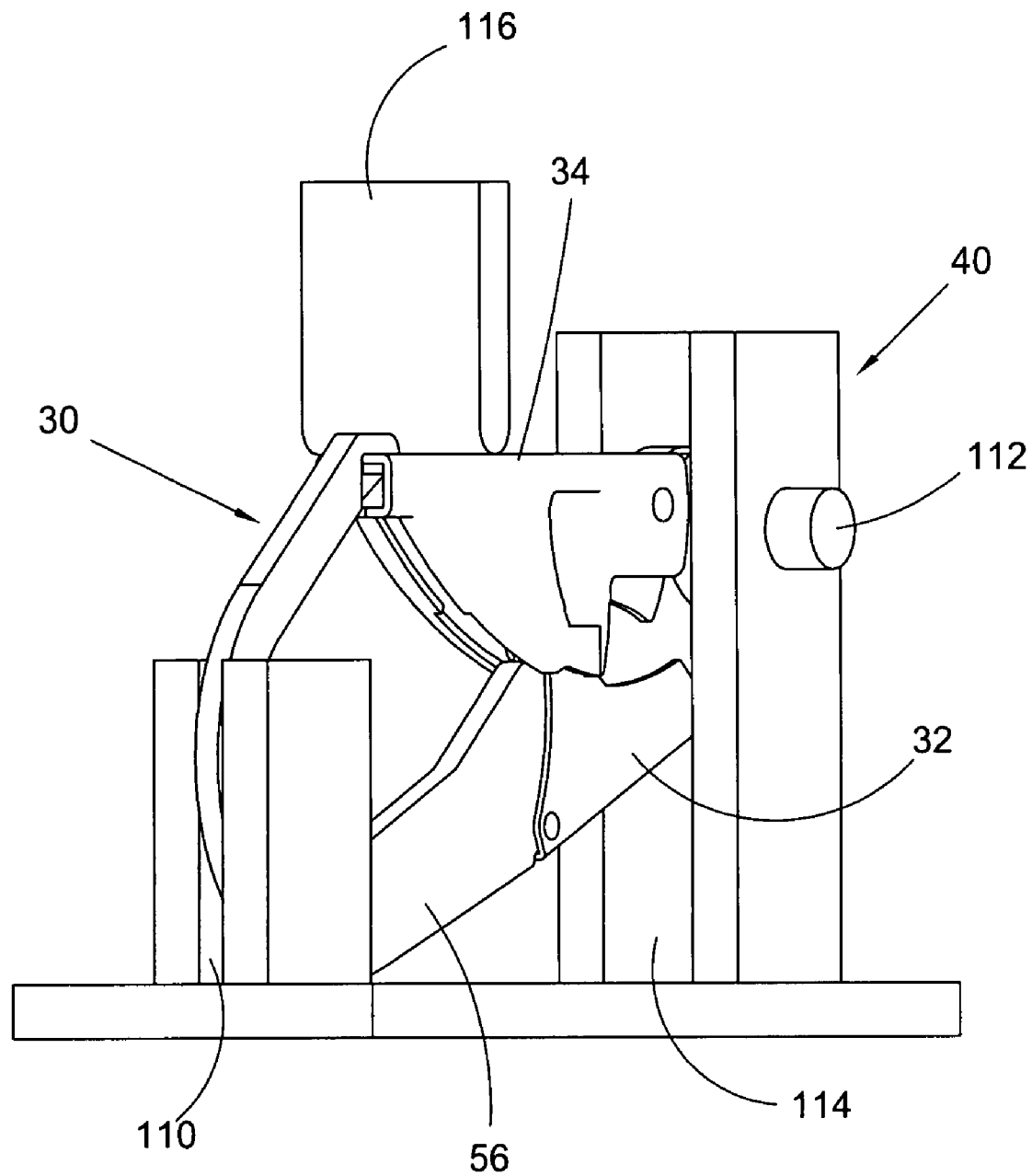
FIG. 8 is a perspective view of the safety hook shown in FIG. 1 arranged in a gate face load force test fixture showing a gate face load being applied.
Figure 9:
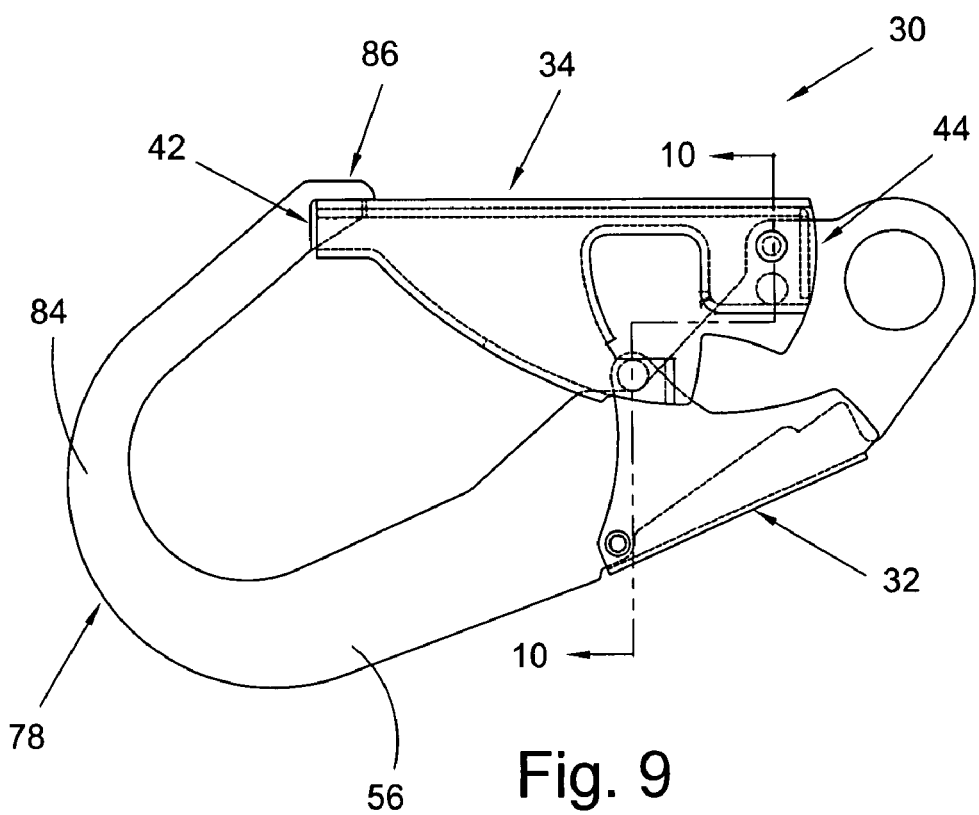
FIG. 9 is a side elevational view of the safety hook shown in FIG. 1 with the release lever in a locked position and the gate in a closed position showing internal features in broken lines.
Figure 10:
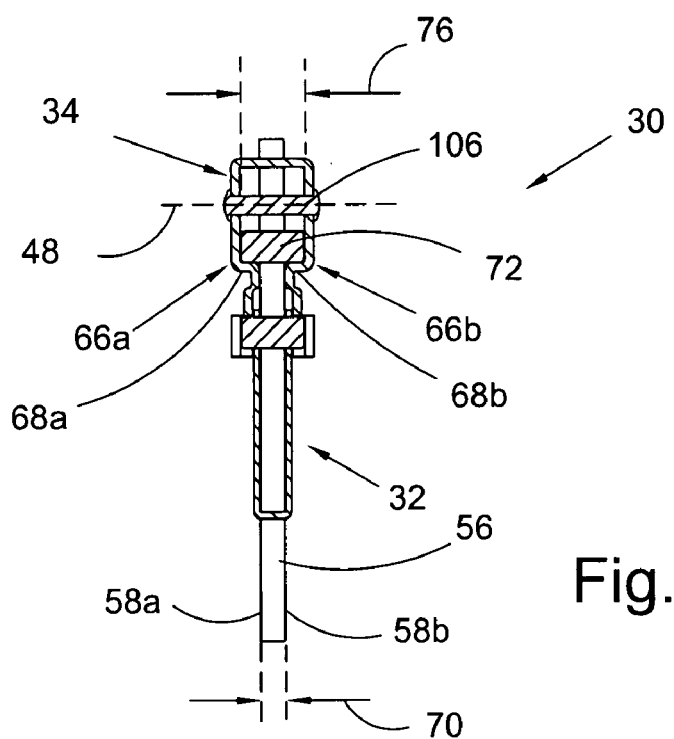
FIG. 10 is a cross-sectional view of the safety hook shown in FIG. 1 taken generally along line 10-10 of FIG. 9.

Adverting now to the figures, FIGS. 1 through 10 show a first embodiment of present invention safety hook 30. More specifically, FIG. 1 shows a perspective view of a first embodiment of the present invention, safety hook 30. FIG. 2 shows a side elevational view of safety hook 30 with release lever 32 in a locked position and gate 34 in a closed position showing internal features in broken lines, while FIG. 2a shows a side elevational view of encircled region 2a in FIG. 2 showing another embodiment of a present invention force resisting means. FIG. 3 shows a side elevational view of safety hook 30 with release lever 32 in an unlocked position and gate 34 in a closed position showing internal features in broken lines, and FIG. 4 shows a side elevational view of safety hook 30 with release lever 32 in an unlocked position and gate 34 in an open position showing internal features in broken lines. FIG. 5 shows an exploded perspective view of safety hook 30, while FIG. 6 shows a perspective view of a second embodiment of a present invention safety hook body, i.e., hook body 36, having integral protrusions 38a and 38b. FIG. 7 shows a side elevational view of safety hook 30 arranged in gate face load force test fixture 40 showing a gate face load being applied and the internal features in broken lines, while FIG. 8 shows a perspective view of safety hook 30 arranged in gate face load force test fixture 40 showing a gate face load being applied. FIG. 9 shows a side elevational view of safety hook 30 with release lever 32 in a locked position and gate 34 in a closed position showing internal features in broken lines, and FIG. 10 shows a cross-sectional view of safety hook 30 taken generally along line 10-10 of FIG. 9. The following discussion is best understood in view of FIGS. 1 through 10.

The present invention broadly comprises a safety mechanism for gate 34 having first and second ends 42 and 44, respectively, fulcrum point 46 intermediate first and second ends 42 and 44, respectively, and first rotational axis 48 proximate second end 44. It should be appreciated that in FIGS. 2 through 4, first rotational axis 48 passes perpendicularly through the plane of these figures. The safety mechanism comprises first force resisting means 50 intermediate fulcrum point 46 and first rotational axis 48, wherein a force applied to first end 42, shown as unidirectional arrow 52, is transmitted toward first rotational axis 48 via fulcrum point 46 and first force resisting means 50 prevents the transmission of this force to first rotational axis 48. As one of ordinary skill in the art appreciates, the rotatable components of a safety hook, e.g., locking lever and gate, are often secured via rivets, i.e., a deformable material. Thus, as forces are applied to the rotatable components, the weakest features in the system are often the rivets or other deformable securing means. The arrangement of the present invention places a stronger component, e.g., first force resisting means 50, in such a location as to prevent transmission of forces to the weaker feature, e.g., the rivets.

In some embodiments, the safety mechanism further comprises hook 30 having hook body 56 comprising two sides 58a and 58b, first through-hole 60 in aligned position with first rotational axis 48. First force resisting means 50 comprises first protrusion 38a and 38b extending from each of sides 58a and 58b, respectively, of hook body 56 and each of first protrusions 38a and 38b is proximate first through-hole 60. Gate 34 comprises spaced apart parallel gate side walls 64a and 64b. First force resisting means 50 further comprises elevated portions 66a and 66b disposed in each of spaced apart parallel gate side walls 64a and 64b. Elevated portions 66a and 66b are arranged opposite each other and each of elevated portions 66a and 66b includes a bearing surface 68a and 68b, respectively, arranged for locking engagement with first protrusions 38a and 38b, respectively. It should be appreciated that first force resisting means 50 may comprise substantially linear elevated portions, e.g., elevated portions 66a and 66b shown in FIGS. 2 through 5 and 7, or first force resisting means 50 may comprise substantially curved portions 69a shown in FIGS. 2a and 69b (not shown). It should also be appreciated that substantially curved elevated portions may be circular, parabolic, hyperbolic, etc., and such variations are within the spirit and scope of the claimed invention.

In some embodiments, e.g., the embodiments shown in FIGS. 1 through 5, 9 and 10, hook body 56 has thickness 70 and first protrusions 38a and 38b are formed by pin 72 inserted through second through-hole 74 in hook body 56. In these embodiments, pin 72 has length 76 which is greater than thickness 70, and bearing surfaces 68a and 68b are arranged for locking engagement with pin 72. In other embodiments, e.g., the embodiment shown in FIG. 6, first protrusions 38a and 38b are formed integrally on hook body 56, i.e., protrusions 62a and 62b. In some of these embodiments, the first protrusions are co-axial, e.g., protrusions 62a and 62b as shown in FIG. 6. One of ordinary skill in the art will recognize that hook body 36 may be manufactured by any known method, e.g., forging or casting, and such variations are within the spirit and scope of the claimed invention. Additionally, it has been found that although protrusions 62a and 62b are shown in the figures as generally cylindrical, other shapes of protrusions are also possible, e.g., spherical, cubic, conical, rectangular prismatic, pyramidal, etc., and such variations are within the spirit and scope of the claimed invention.

Thus in some embodiments, the present invention broadly comprises hook 30 comprising first force resisting means 50, hook body 56 having two sides 58a and 58b, first and second ends 78 and 80, first and second through-holes 82 and 60, respectively, and first force resisting means 50 comprises a first protrusion, e.g., protrusions 38a and 38b, extend from each of sides 58a and 58b, respectively, and each of the first protrusions is proximate second through-hole 60. First end 78 comprises bent portion 84 having nose 86, while second end 80 comprises opening 88. First and second through-holes 82 and 60, respectively, define first and second rotational axes 90 and 48, respectively. Hook 30 also comprises release lever 32 having spaced apart parallel lever side walls 92a and 92b. Lever side walls 92a and 92b comprise first locking means 94 and third and fourth through-holes 96a and 96b, respectively. Third and fourth through-holes 96a and 96b are oppositely disposed, aligned with first through-hole 82, and include release lever mounting rivet 98 disposed therethrough. Hook 30 still further comprises gate 34 having spaced apart parallel gate side walls 64a and 64b. Gate side walls 64a and 64b comprise second locking means 102 and fifth and sixth through-holes 104a and 104b, respectively. Fifth and sixth through-holes 104a and 104b, respectively, are oppositely disposed, aligned with second through-hole 60, and include gate mounting rivet 106 disposed therethrough. Gate 34 is arranged to engage nose 86. Second locking means 102 is arranged to complimentarily engage first locking means 94 and first force resisting means 50 is arranged to engage first protrusions 38a and 38 when a force, as shown by unidirectional arrow 52, is applied against gate 34 in a direction to rotate gate 34 about second rotational axis 48, i.e., in the direction shown by unidirectional 108. It should be appreciated that pivoting of release lever 32 about first rotational axis 90 disengages first and second locking means 94 and 102, respectively, and permits pivoting of gate 34 about second rotational axis 48.

As described supra, in some embodiments, e.g., the embodiments shown in FIGS. 1 through 5, 9 and 10, hook body 56 has thickness 70 and first protrusions 38a and 38b are formed by pin 72 inserted through seventh through-hole 74 in hook body 56, and pin 72 has length 76 which is greater than thickness 70. In other embodiments, e.g., the embodiment shown in FIG. 6, first protrusions 38a and 38b are formed integrally on hook body 56, i.e., protrusions 62a and 62b. In some of these embodiments, the first protrusions are co-axial, e.g., protrusions 62a and 62b as shown in FIG. 6. Similarly, first force resisting means 50 further comprises elevated portions 66a and 66b disposed in each of spaced apart parallel gate side walls 64a and 64b and elevated portions 66a and 66b are arranged opposite each other and each of elevated portions 66a and 66b includes a bearing surface 68a and 68b, respectively, arranged for locking engagement with first protrusions 38a and 38b, respectively. As described supra, it should be appreciated that first force resisting means 50 may comprise substantially linear elevated portions, e.g., elevated portions 66a and 66b shown in FIGS. 2 through 5 and 7, or first force resisting means 50 may comprise substantially curved portions 69a shown in FIGS. 2a and 69b (not shown). It should also be appreciated that substantially curved elevated portions may be circular, parabolic, hyperbolic, etc., and such variations are within the spirit and scope of the claimed invention.

The test standard described above, i.e., the ANSI and OSHA test standards, is performed using gate face load force test fixture 40 shown in FIGS. 7 and 8. Hook 30 is mounted on test fixture 40 by inserting first end 78 within slot 110 and inserting opening 88 over protrusion 112 and within slot 114. Subsequently, a force is applied to gate 34 along unidirectional arrow 52 via load inducer 116. The force applied to gate 34 is transmitted to fulcrum point 46, thereby resulting in a force against first locking means 94, i.e., according to unidirectional arrow 118. Then, the force is multiplied according to a lever effect as the force is transmitted toward gate mounting rivet 106. In other words, the distance between the location where the force is introduced to gate 34 and fulcrum point 46 is greater than the distance between fulcrum point 46 and gate mounting rivet 106. Although an increased force is transmitted to gate mounting rivet 106 due to the previously described lever effect, it should be appreciated that configurations may occur where the force is not increased but is decreased, e.g., where the distance between the point of force application and the fulcrum is less than the distance between the fulcrum and the point of force transmission, and such variations are within the spirit and scope of the claimed invention. According to the present invention, bearing surfaces 68a and 68b engage first protrusions 38a and 38b, thereby preventing transmission of the force to gate mounting rivet 106, as shown by unidirectional arrow 120. Thus, first force resisting means 50 prevents the failure of gate mounting rivet 106, i.e., a weaker, deformable material. It should be appreciated that in the embodiments shown in FIGS. 1 through 10, forces are prevented from reaching release lever mounting rivet 98 because contact between locking pin 122 and inner surface 124 prevents such transmission of forces.

Figure 11:
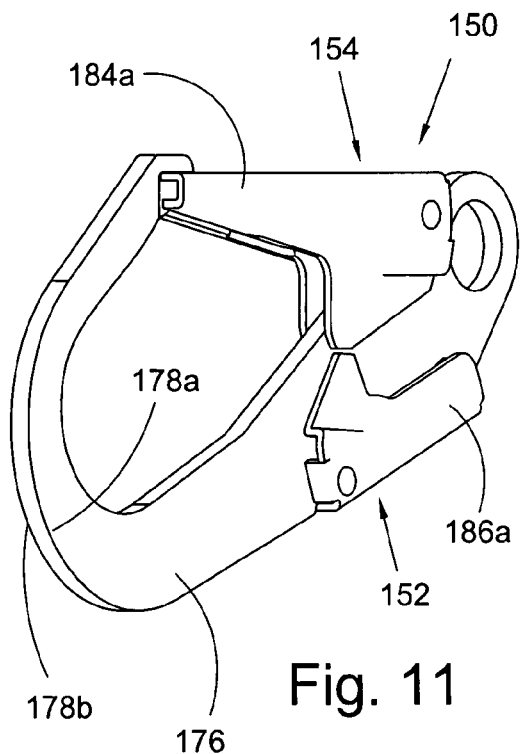
FIG. 11 is a perspective view of a second embodiment of a present invention safety hook.
Figure 12A:
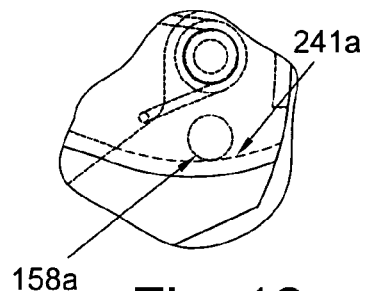
FIG. 12a is a side elevational view of encircled region 12a in FIG. 12 showing still another embodiment of a present invention force resisting means.
Figure 12B:
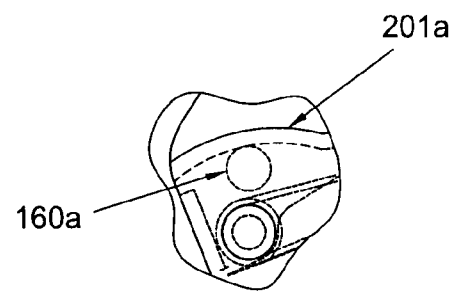
FIG. 12b is a side elevational view of encircled region 12b in FIG. 12 showing yet another embodiment of a present invention force resisting means.
Figure 12:
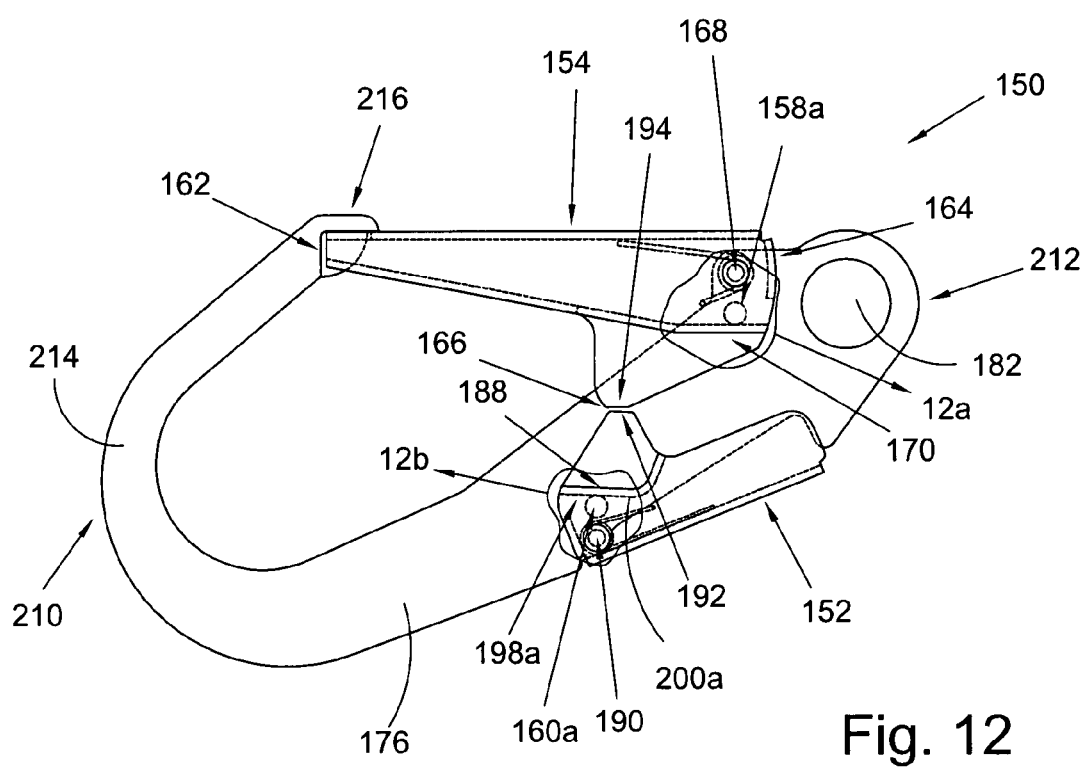
FIG. 12 is a side elevational view of the safety hook shown in FIG. 11 with the release lever in a locked position and the gate in a closed position showing internal features in broken lines.
Figure 13:
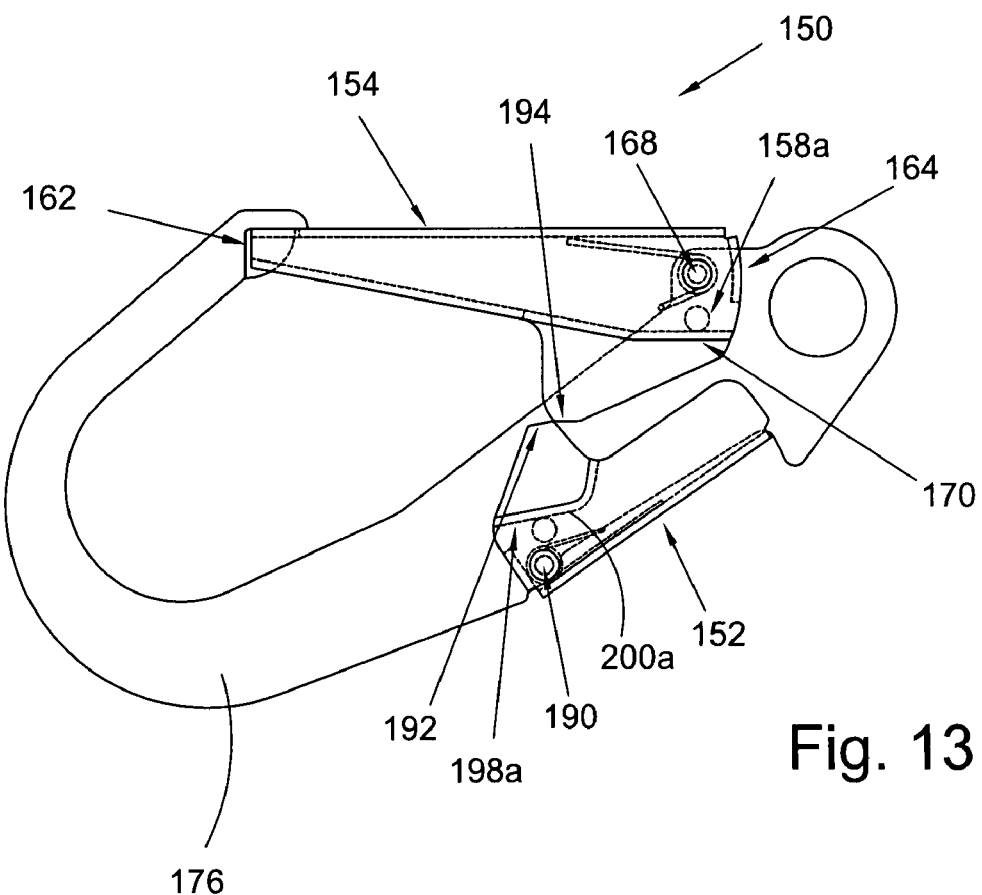
FIG. 13 is a side elevational view of the safety hook shown in FIG. 11 with the release lever in an unlocked position and the gate in a closed position showing internal features in broken lines.
Figure 14:
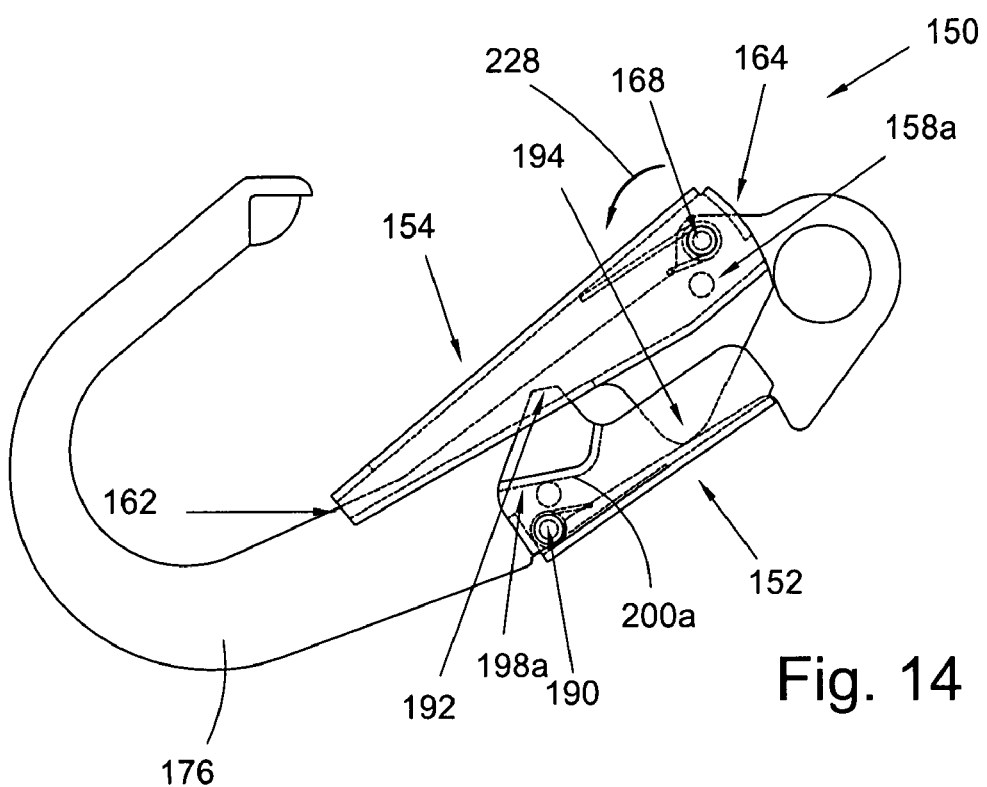
FIG. 14 is a side elevational view of the safety hook shown in FIG. 11 with the release lever in an unlocked position and the gate in an open position showing internal features in broken lines.
Figure 15:
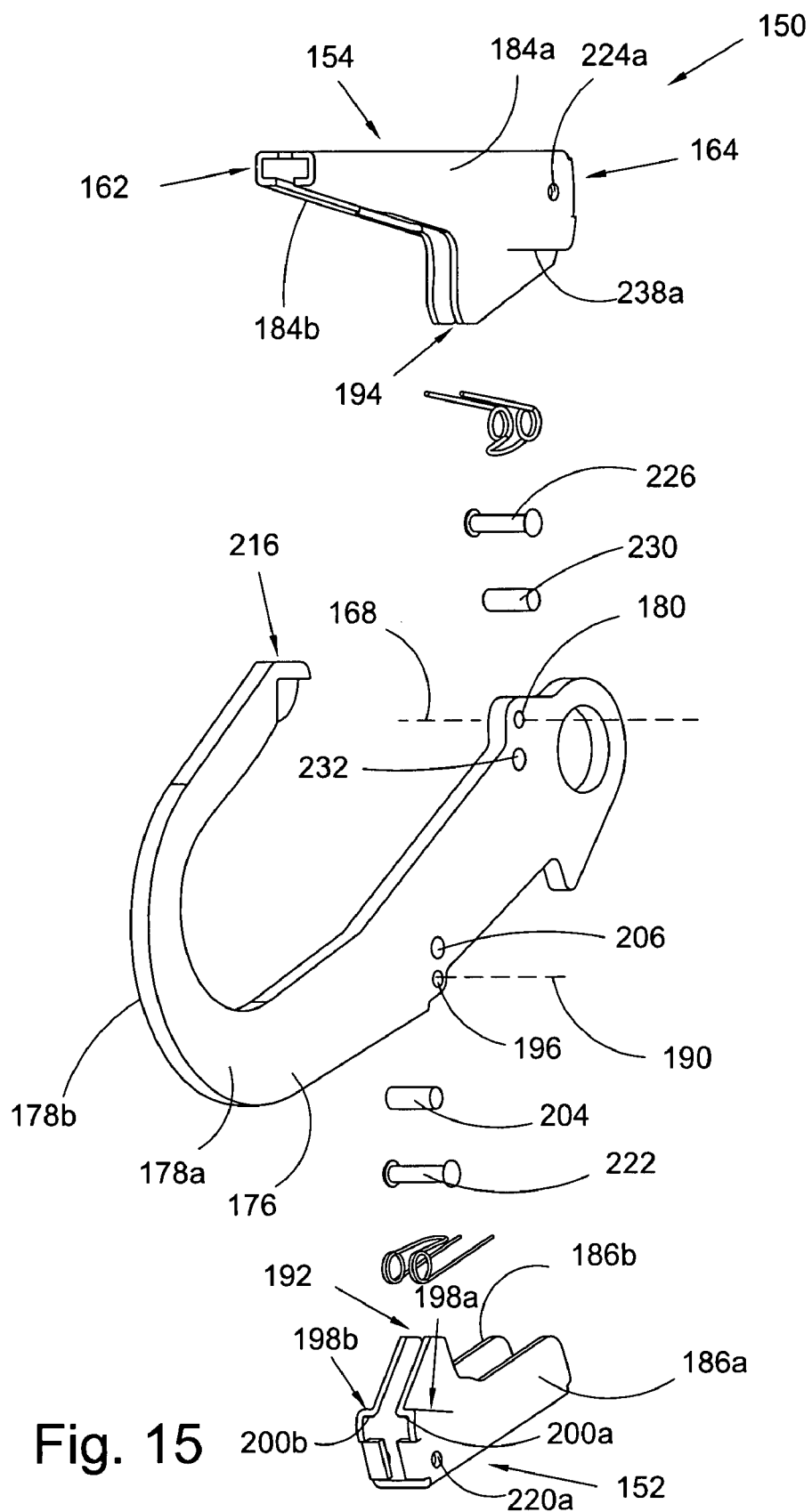
FIG. 15 is an exploded perspective view of the safety hook shown in FIG. 11.
Figure 16:
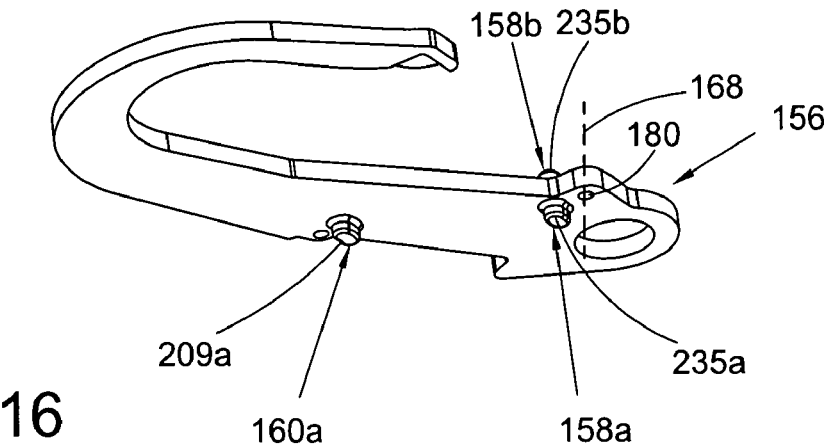
FIG. 16 is a perspective view of a third embodiment of a present invention safety hook body having integral protrusions.
Figure 17:
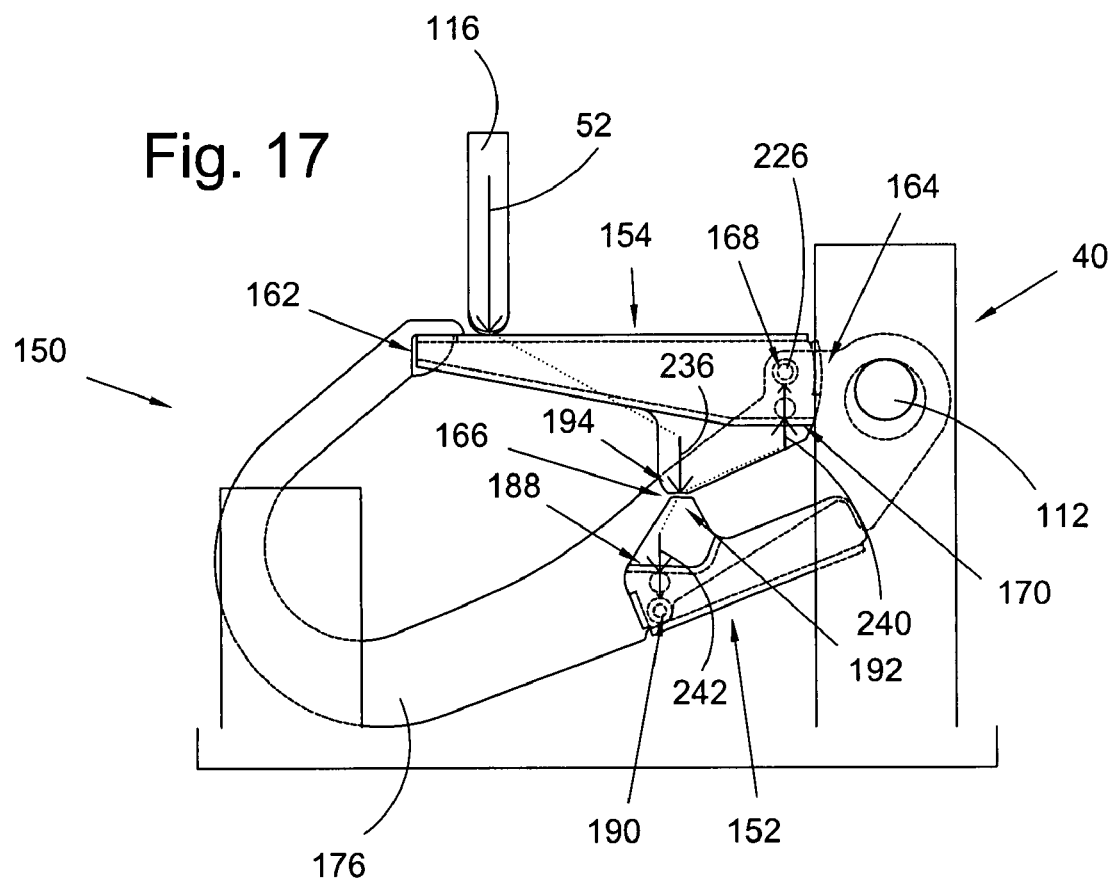
FIG. 17 is a side elevational view of the safety hook shown in FIG. 11 arranged in a gate face load force test fixture showing a gate face load being applied and the internal features in broken lines.
Figure 18:
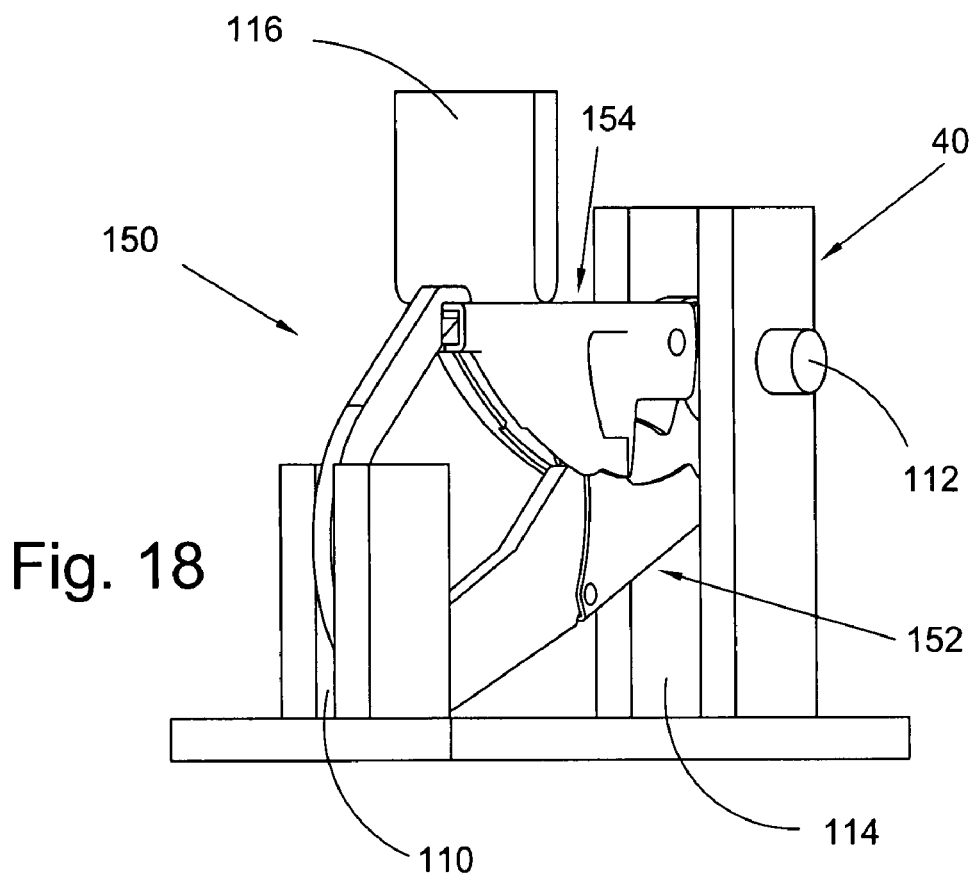
FIG. 18 is a perspective view of the safety hook shown in FIG. 11 arranged in a gate face load force test fixture showing a gate face load being applied.
Figure 19:
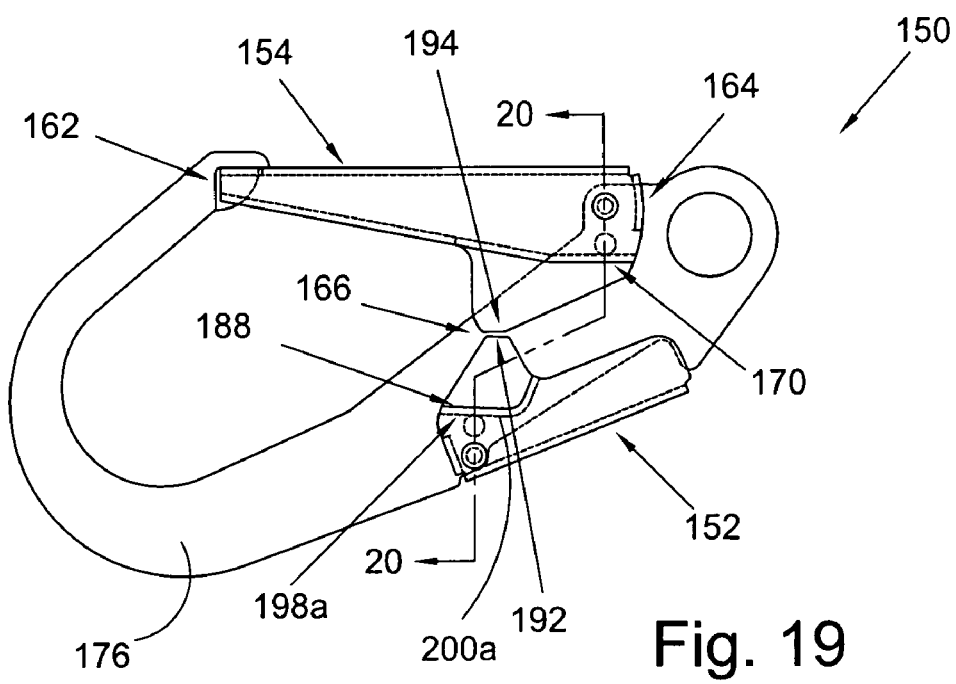
FIG. 19 is a side elevational view of the safety hook shown in FIG. 11 with the release lever in a locked position and the gate in a closed position showing internal features in broken lines.
Figure 20:
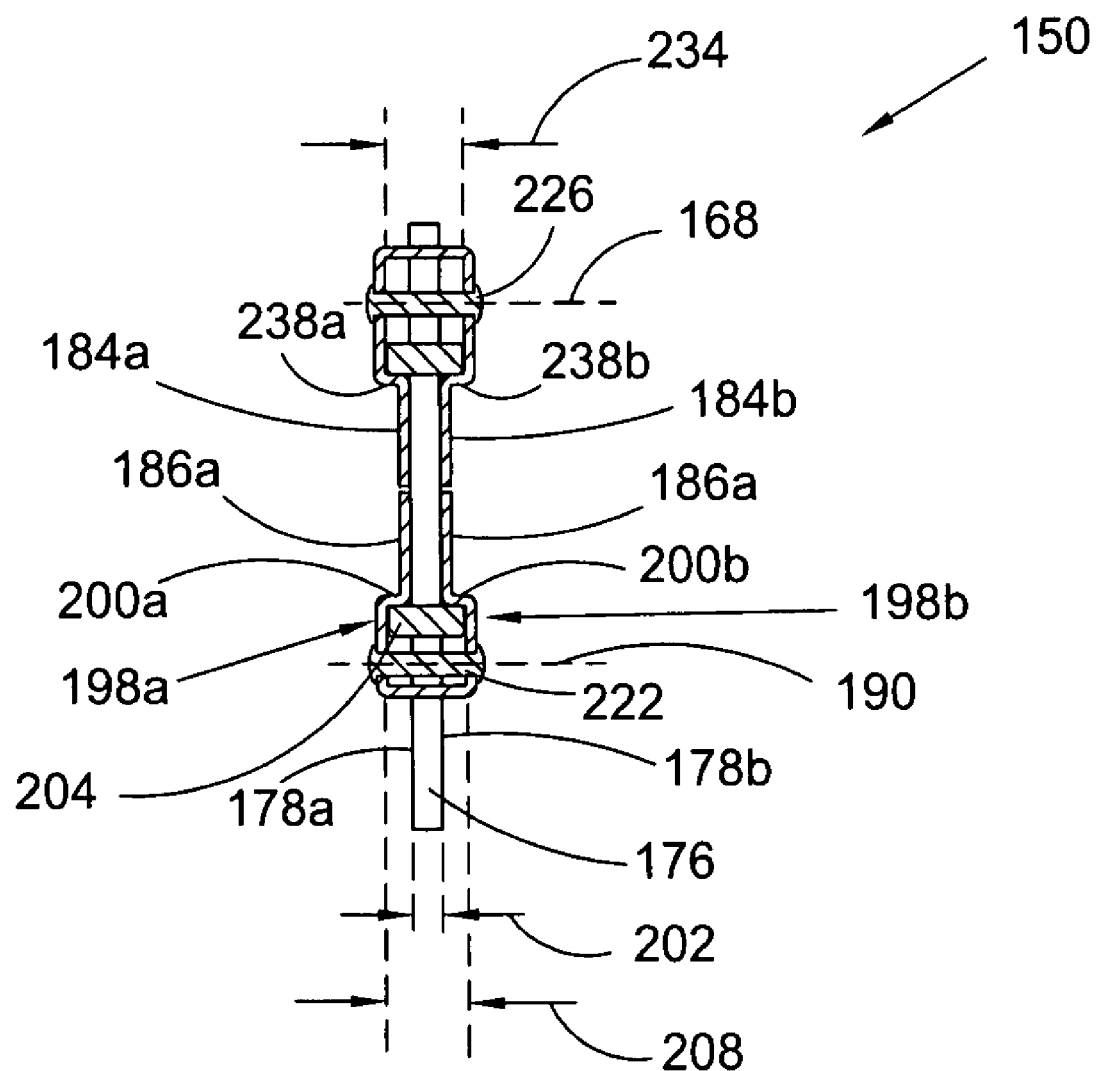
FIG. 20 is a cross-sectional view of the safety hook shown in FIG. 11 taken generally along line 20-20 of FIG. 19.

FIGS. 11 through 20 show a second embodiment of a present invention safety hook, i.e., safety hook 150. FIG. 11 shows a perspective view of safety hook 150. FIG. 12 shows a side elevational view of safety hook 150 with release lever 152 in a locked position and gate 154 in a closed position showing internal features in broken lines, while FIG. 12a shows a side elevational view of encircled region 12a in FIG. 12 showing still another embodiment of a present invention force resisting means and FIG. 12b shows a side elevational view of encircled region 12b in FIG. 12 showing yet another embodiment of a present invention force resisting means. FIG. 13 shows a side elevational view of safety hook 150 with release lever 152 in an unlocked position and gate 154 in a closed position showing internal features in broken lines, and FIG. 14 shows a side elevational view of safety hook 150 with release lever 152 in an unlocked position and gate 154 in an open position showing internal features in broken lines. FIG. 15 shows an exploded perspective view of safety hook 150, while FIG. 16 shows a perspective view of a third embodiment of a present invention safety hook body, i.e., hook body 156, having integral protrusions 158a, 158b, 160a and 160b. FIG. 17 shows a side elevational view of safety hook 150 arranged in gate face load force test fixture 40 showing a gate face load being applied and the internal features in broken lines, while FIG. 18 shows a perspective view of safety hook 150 arranged in gate face load force test fixture 40 showing a gate face load being applied. FIG. 19 shows a side elevational view of safety hook 150 with release lever 152 in a locked position and gate 154 in a closed position showing internal features in broken lines, and FIG. 20 shows a cross-sectional view of safety hook 150 taken generally along line 20-20 of FIG. 19. The following discussion is best understood in view of FIGS. 11 through 20.

Similar to the embodiments described above, the present invention broadly comprises a safety mechanism for gate 154 having first and second ends 162 and 164, respectively, fulcrum point 166 intermediate first and second ends 162 and 164, respectively, and first rotational axis 168 proximate second end 164. It should be appreciated that in FIGS. 12 through 14, first rotational axis 168 passes perpendicularly through the plane of these figures. The safety mechanism comprises first force resisting means 170 intermediate fulcrum point 166 and first rotational axis 168, wherein a force applied to first end 162, shown as unidirectional arrow 172, is transmitted toward first rotational axis 168 via fulcrum point 166 and first force resisting means 170 prevents the transmission of this force to first rotational axis 168. In some embodiments, the safety mechanism further comprises hook 150 having hook body 176 comprising two sides 178a and 178b, first through-hole 180 in aligned position with first rotational axis 168. First force resisting means 170 comprises first protrusion 158a and 158b extending from each of sides 178a and 178b, respectively, of hook body 176 and each of first protrusions 158a and 158b is proximate first through-hole 180. Gate 154 comprises spaced apart parallel gate side walls 184a and 184b.

Unlike the above described embodiments, in some of these embodiments the safety mechanism further comprises release lever 152 having spaced apart parallel lever side walls 186a and 186b, second force resisting means 188 and second rotational axis 190. Lever side walls 186a and 186b comprises first locking means 192 and gate side walls 184a and 184b comprise second locking means 194 arranged to complimentarily engage first locking means 192. Hook body 176 further comprises second through-hole 196 in aligned position with second rotational axis 190 and second force resisting means 188 comprises second protrusions 160a and 160b which extend from each of sides 178a and 178b of hook body 176 and each of second protrusions 160a and 160b is proximate second through-hole 196. Second force resisting means 188 is arranged to engage second protrusions 160a and 160b when the force is applied to gate 154. In some embodiments, second force resisting means 188 further comprises elevated portions 198a and 198b disposed in each of spaced apart parallel lever side walls 186a and 186b, respectively. Elevated portions 198a and 198b are arranged opposite each other and each of elevated portions 198a and 198b includes bearing surfaces 200a and 200b, respectively, arranged for locking engagement with one of second protrusions 160a and 160b. In these embodiments, it should be appreciated that second force resisting means 188 may comprise substantially linear elevated portions, e.g., elevated portions 198a and 198b shown in FIGS. 11 through 15, 17, 19 and 20, or second force resisting means 188 may comprise substantially curved portions 201a shown in FIGS. 12b and 201b (not shown). It should also be appreciated that substantially curved elevated portions may be circular, parabolic, hyperbolic, etc., and such variations are within the spirit and scope of the claimed invention.

As described above, in some of these embodiments, hook body 176 has thickness 202 and second protrusions 160a and 160b are formed by pin 204 inserted through through-hole 206 in hook body 176. Pin 204 has a length 208 which is greater than thickness 202. In other embodiments, second protrusions 160a and 160b are formed integrally on hook body 176, e.g., protrusions 209a and 209b, and in some of these embodiments, the second protrusions are co-axial.

Similar to the embodiments described above, the present invention broadly comprises hook 150 comprising first force resisting means 170, hook body 176 having two sides 178a and 178b, first and second ends 210 and 212, first and second through-holes 196 and 180, respectively, and first force resisting means 170 comprises first protrusion 158a and 158b, which extend from each of sides 178a and 178b, respectively, and each of first protrusions 158a and 158b is proximate second through-hole 180. First end 210 comprises bent portion 214 having nose 216, while second end 212 comprises opening 218. First and second through-holes 196 and 180, respectively, define first and second rotational axes 190 and 168, respectively. Hook 150 also comprises release lever 152 having spaced apart parallel lever side walls 186a and 186b. Lever side walls 186a and 186b comprise first locking means 192 and third and fourth through-holes 220a and 220b, respectively. Third and fourth through-holes 220a and 220b are oppositely disposed, aligned with first through-hole 196, and include release lever mounting rivet 222 disposed therethrough. Hook 150 still further comprises gate 154 having spaced apart parallel gate side walls 184a and 184b. Gate side walls 184a and 184b comprise second locking means 194 and fifth and sixth through-holes 224a and 224b, respectively. Fifth and sixth through-holes 224a and 224b, respectively, are oppositely disposed, aligned with second through-hole 180, and include gate mounting rivet 226 disposed therethrough. Gate 154 is arranged to engage nose 216. Second locking means 194 is arranged to complimentarily engage first locking means 192 and first force resisting means 170 is arranged to engage first protrusions 158a and 158b when a force, as shown by unidirectional arrow 52, is applied against gate 154 in a direction to rotate gate 154 about second rotational axis 168, i.e., in the direction shown by unidirectional 228. It should be appreciated that pivoting of release lever 152 about first rotational axis 190 disengages first and second locking means 192 and 194, respectively, and permits pivoting of gate 154 about second rotational axis 168.

Unlike the embodiments described above in view of FIGS. 1 through 10, in some of these embodiments hook 150 further comprises second force resisting means 188, and second force resisting means 188 comprises second protrusions 160a and 160b, which extend from each of sides 178a and 178b, respectively, of hook body 176 and each of second protrusions 160a and 160b is proximate first through-hole 196. Second force resisting means 188 is arranged to engage second protrusions 160a and 160b when the force is applied against gate 154 in a direction to rotate gate 154 about second rotational axis 168, i.e., in the directional of unidirectional arrow 228. Second force resisting means 188 further comprises elevated portions 198a and 198b disposed in spaced apart parallel lever side walls 186a and 186b, respectively. Elevated portions 198a and 198b are arranged opposite each other and include bearing surface 200a and 200b, respectively, arranged for locking engagement with second protrusions 160a and 160b, respectively. Additionally, it should be appreciated that second force resisting means 188 may comprise substantially linear elevated portions, e.g., elevated portions 198a and 198b shown in FIGS. 11 through 15, 17, 19 and 20, or second force resisting means 188 may comprise substantially curved portions 201a shown in FIGS. 12b and 201b (not shown). It should also be appreciated that substantially curved elevated portions may be circular, parabolic, hyperbolic, etc., and such variations are within the spirit and scope of the claimed invention.

As described supra, in some embodiments, e.g., the embodiments shown in FIGS. 11 through 15, 19 and 20, hook body 176 has thickness 202 and first protrusions 158a and 158b are formed by pin 230 inserted through through-hole 232 in hook body 176 and pin 230 has length 234 which is greater than thickness 202. In other embodiments, e.g., the embodiment shown in FIG. 16, first protrusions 158a and 158b are formed integrally on hook body 176, i.e., protrusions 235a and 235b. In some of these embodiments, the first protrusions are co-axial, e.g., protrusions 235a and 235b as shown in FIG. 16.

As described above, the ANSI and OSHA test standards are performed using gate face load force test fixture 40 shown in FIGS. 17 and 18. Hook 150 is mounted on test fixture 40 by inserting first end 210 within slot 110 and inserting opening 218 over protrusion 112 and within slot 114. Subsequently, a force is applied to gate 154 along unidirectional arrow 52 via load inducer 116. The force applied to gate 154 is transmitted to fulcrum point 166, thereby resulting in a force against first locking means 194, i.e., according to unidirectional arrow 236. Then, the force is multiplied according to a lever effect as the force is transmitted toward gate mounting rivet 226. In other words, the distance between the location where the force is introduced to gate 154 and fulcrum point 166 is greater than the distance between fulcrum point 166 and gate mounting rivet 226. According to the present invention, bearing surfaces 238a and 238b engage first protrusions 158a and 158b, respectively, thereby preventing transmission of the force to gate mounting rivet 226, as shown by unidirectional arrow 240. Although bearing surfaces 238a and 238b are substantially linear in FIGS. 11 through 15, 17, 19 and 20, it should be appreciated that the bearing surfaces may also be substantially curved, e.g., bearing surfaces 241a shown FIGS. 12a and 241b (not shown). It should also be appreciated that substantially curved elevated portions may be circular, parabolic, hyperbolic, etc., and such variations are within the spirit and scope of the claimed invention. Thus, first force resisting means 170 prevents the failure of gate mounting rivet 226, i.e., a weaker, deformable material. Additionally, in the foregoing embodiments, the transmission of force to lever mounting rivet 222 is also prevented. In this instance, force is applied to gate 154 as previously described; however the fulcrum point is now second rotational axis 168. Thus, the force applied to gate 154, e.g., the force applied by 116, is multiplied as it is transmitted from second locking means 194 to first locking means 192. Subsequently, the force is transmitted toward lever mounting rivet 222 along the path shown by unidirectional arrow 242. According to the present invention, bearing surfaces 200a and 200b engage second protrusions 160a and 160b, respectively, thereby preventing transmission of the force to lever mounting rivet 222. Thus, second force resisting means 188 prevents the failure of lever mounting rivet 222, i.e., a weaker, deformable material.

Figure 23:
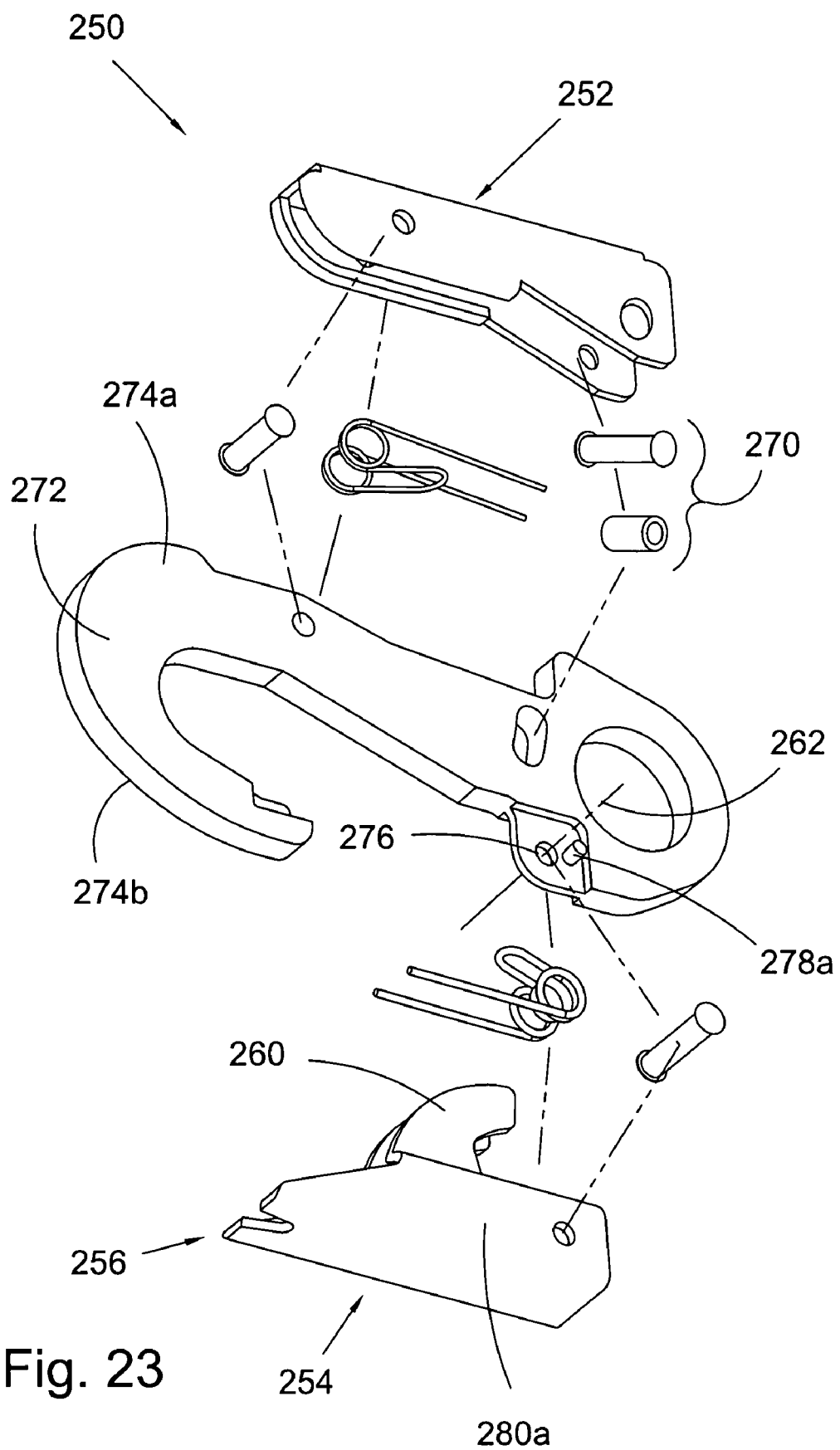

FIGS. 21 through 23 show a third embodiment of a present invention safety hook, i.e., safety hook 250. FIG. 21 shows a perspective view of safety hook 250, while FIG. 22 shows a side elevational view of safety hook 250 with release lever 252 in a locked position and gate 254 in a closed position showing internal features in broken lines. FIG. 22a shows a side elevational view of encircled region 22a in FIG. 22 showing still yet another embodiment of a present invention force resisting means and FIG. 23 shows an exploded perspective view of safety hook 250. The following discussion is best understood in view of FIGS. 21 through 23.

Safety hook 250 comprises gate 254 having first and second ends 256 and 258, respectively, locking means 260 and first rotational axis 262 proximate second end 258, wherein a force (shown by unidirectional arrow 263) applied to first end 256 is transmitted toward first rotational axis 262 via locking means 260. This embodiment of a present invention safety mechanism comprises first force resisting means 264 intermediate first rotational axis 262 and the transmitted force, wherein first force resisting means 264 prevents transmission of force (shown by unidirectional 268) to first rotational axis 262. In other words, applying a force to gate 254 according to unidirectional arrow 266 causes gate 254 to rotate about first rotational axis 262 and thereby press locking means 260 against locking pin 270. The contact of locking means 260 against locking pin 270 causes a reactive force in the direction opposite to such contact, i.e., in the direction of unidirectional arrow 268. This reactive force, being applied to gate 254, causes gate 254 to press in the direction of unidirectional arrow 268, however first force resisting means 264 prevents the transmission of the reactive force to first rotational axis 262. In some embodiments, first force resisting means 264 is proximate first rotational axis 262, e.g., the embodiments shown in FIGS. 21 through 23, however it should be appreciated that first force resisting means 264 may be positioned anywhere on hook 250 provided means 264 is intermediate first rotational axis 262 and the transmitted force.

In this embodiment of the present invention safety mechanism, safety hook 250 further comprises hook body 272 having sides 274a and 274b and a first through-hole 276 in aligned position with first rotational axis 262. First force resisting means 264 comprises first protrusion 278a and 278b extending from each of sides 274a and 274b. Each of first protrusions 278a and 278b are proximate first through-hole 276, and gate 254 comprises spaced apart parallel gate side walls 280a and 280b. First force resisting means 264 further comprises elevated portions 282a and 282b disposed in each of spaced apart parallel gate side walls 280a and 280b, respectively. Elevated portions 282a and 282b are arranged opposite each other and each includes bearing surface 284a and 284b, respectively, arranged for locking engagement with first protrusions 278a and 278b, respectively. As with the embodiments described above, it should be appreciated that first force resisting means 264 may comprise substantially linear elevated portions, e.g., elevated portions 282a and 282b shown in FIGS. 21, 22 and 23, or first force resisting means 264 may comprise substantially curved portions 286a shown in FIGS. 22b and 286b (not shown). It should also be appreciated that substantially curved elevated portions may be circular, parabolic, hyperbolic, etc., and such variations are within the spirit and scope of the claimed invention. In this embodiment, as with the embodiments described above, hook body 272 has a thickness and first protrusions 278a and 278b may be formed by a pin inserted through a second through-hole, where the pin has a length greater than the thickness of hook body 272. Similarly, protrusions 278a and 278b may be formed integrally on hook body 272, and in some embodiments, protrusions 278a and 278b are co-axial.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A safety mechanism comprising:
   a first force resisting means;
   a hook comprising a gate having first and second ends, a fulcrum point intermediate said first and second ends and a first rotational axis proximate said second end; and,
   a second force resisting means,
   wherein said first force resisting means is intermediate said fulcrum point and said first rotational axis, and wherein a force applied to said first end is transmitted toward said first rotational axis via said fulcrum point and said first force resisting means prevents transmission of said force to said first rotational axis,
   wherein said hook further comprises a hook body having two sides, a first through-hole in aligned position with said first rotational axis and said first force resisting means comprises a first protrusion extending from each of said two sides of said hook body and each of the first protrusions is proximate said first through-hole and wherein said gate further comprises spaced apart parallel gate side walls, and wherein said hook further comprises a release lever having spaced apart parallel lever side walls and a second rotational axis, said lever side walls comprising a first locking means, said gate side walls comprising a second locking means arranged to complimentarily engage said first locking means, said hook body further comprises a second through-hole in aligned position with said second rotational axis and said second force resisting means comprises a second protrusion extending from each of said two sides of said hook body and each of the second protrusions is proximate said second through-hole, and wherein said second force resisting means is arranged to engage said second protrusions when said force is applied to said gate.

2. The safety mechanism of claim 1 wherein said first force resisting means further comprises an elevated portion disposed in each of said spaced apart parallel gate side walls and, said elevated portions arranged opposite each other and each of said elevated portions includes a bearing surface arranged for locking engagement with one of said first protrusions.

3. The safety mechanism of claim 2 wherein said elevated portions are substantially linear or substantially curved.

4. The safety mechanism of claim 1 wherein said hook body has a thickness and said first protrusions are formed by a pin inserted through a second through-hole in said hook body, said pin having a length greater than said thickness.

5. The safety mechanism of claim 1 wherein said first protrusions are formed integrally on said hook body.

6. The safety mechanism of claim 5 wherein said first protrusions are co-axial.

7. The safety mechanism of claim 1 wherein said second force resisting means further comprises an elevated portion disposed in each of said spaced apart parallel lever side walls, said elevated portions arranged opposite each other and each of said elevated portions includes a bearing surface arranged for locking engagement with one of said second protrusions.

8. The safety mechanism of claim 7 wherein said elevated portions are substantially linear or substantially curved.

9. The safety mechanism of claim 1 wherein said hook body has a thickness and said second protrusions are formed by a pin inserted through said second through-hole in said hook body, said pin having a length greater than said thickness.

10. The safety mechanism of claim 1 wherein said second protrusions are formed integrally on said hook body.

11. The safety mechanism of claim 10 wherein said second protrusions are co-axial.

12. A hook comprising:
a first force resisting means;
a hook body having two sides, first and second ends, first and second through-holes and said first force resisting means comprises a first protrusion extending from each of said two sides and each of the first protrusions is proximate said second through-hole, said first end comprises a bent portion having a nose, said second end comprises an opening, and said first and second through-holes define first and second rotational axes, respectively;
a release lever having spaced apart parallel lever side walls, said lever side walls comprising a first locking means and third and fourth through-holes, said third and fourth through-holes are oppositely disposed, aligned with said first through-hole, and include a release lever mounting rivet disposed therethrough; and,
a gate having spaced apart parallel gate side walls, said gate side walls comprising a second locking means and fifth and sixth through-holes, said fifth and sixth through-holes are oppositely disposed, aligned with said second through-hole, and include a gate mounting rivet disposed therethrough, said gate is arranged to engage said nose, said second locking means is arranged to complimentarily engage said first locking means, wherein said gate is arranged to engage said first protrusions when a force is applied against said gate in a direction to rotate said gate about said second rotational axis and wherein pivoting of said release lever about said first rotational axis disengages said first and second locking means and permits pivoting of said gate about the second rotational axis.

13. The hook of claim 12 wherein said hook body has a thickness and said first protrusions are formed by a pin inserted through a seventh through-hole in said hook body, said pin having a length greater than said thickness.

14. The hook of claim 12 wherein said first protrusions are formed integrally on said hook body.

15. The hook of claim 14 wherein said first protrusions are co-axial.

16. The hook of claim 12 wherein said first force resisting means further comprises an elevated portion disposed in each of said spaced apart parallel gate side walls, said elevated portions arranged opposite each other and each of said elevated portions includes a bearing surface arranged for locking engagement with one of said first protrusions.

17. The hook of claim 16 wherein said elevated portions are substantially linear or substantially curved.

18. The hook of claim 12 further comprising a second force resisting means, said second force resisting means comprises a second protrusion extending from each of said two sides of said hook body and each of the second protrusions is proximate said first through-hole, wherein said release lever is arranged to engage said second protrusions when said force is applied against said gate in a direction to rotate said gate about said second rotational axis.

19. The hook of claim 18 wherein said second force resisting means further comprises an elevated portion disposed in each of said spaced apart parallel lever side walls, said elevated portions arranged opposite each other and each of said elevated portions includes a bearing surface arranged for locking engagement with one of said second protrusions.

20. The hook of claim 19 wherein said elevated portions are substantially linear or substantially curved.

21. The hook of claim 18 wherein said hook body has a thickness and said second protrusions are formed by a pin inserted through a seventh through-hole in said hook body, said pin having a length greater than said thickness.

22. The hook of claim 18 wherein said second protrusions are formed integrally on said hook body.

23. The hook of claim 22 wherein said second protrusions are co-axial.

* * * * *